US012663916B1

(12) United States Patent
Murray et al.

(10) Patent No.: US 12,663,916 B1
(45) Date of Patent: Jun. 23, 2026

(54) METHODS AND USER INTERFACES FOR DESIGNING CELL-BASED SCREENING ASSAY EXPERIMENTS

(71) Applicant: Recursion Pharmaceuticals, Inc., Salt Lake City, UT (US)

(72) Inventors: Adam Smith Murray, Lynnwood, WA (US); Anthus John Williams, Salt Lake City, UT (US); Benjamin Judson Sukow, Salt Lake City, UT (US); Brian James Bleakley, Brier, WA (US); Chadwick Thelen Davis, Salt Lake City, UT (US); Condie Thomas Swallow, II, West Valley City, UT (US); Daniel James Anderson, Redwood City, CA (US); Eric Thomas Hurst, Sandy, UT (US); Jathine Wong, Salt Lake City, UT (US); Katherine Bowie Matsumoto Santos, Salt Lake City, UT (US); Katrina Stacie Rodzon, Tacoma, WA (US); Kristen Rose Morse, Boise, ID (US); Peter Foster McLean, Centerville, UT (US); Teresa Kay Anderson-Myers, Salt Lake City, UT (US)

(73) Assignee: Recursion Pharmaceuticals, Inc., Salt Lake City, UT (US)

( * ) Notice: Subject to any disclaimer, the term of this patent is extended or adjusted under 35 U.S.C. 154(b) by 257 days.

(21) Appl. No.: 18/640,702

(22) Filed: Apr. 19, 2024

(51) Int. Cl.
*G06F 3/04817* (2022.01)
*G06F 3/04847* (2022.01)

(52) U.S. Cl.
CPC .............................. *G06F 3/04847* (2013.01)

(58) Field of Classification Search
CPC ................................................. G06F 3/04847
See application file for complete search history.

(56) References Cited

U.S. PATENT DOCUMENTS

| | | | | |
|---|---|---|---|---|
| 2003/0032791 A1* | 2/2003 | Alan | ......................... | A61P 7/00 435/325 |
| 2004/0115838 A1* | 6/2004 | Quake | ................. | F16K 99/0048 422/50 |
| 2005/0004026 A1* | 1/2005 | Kasibhatla | ......... | A61K 51/0412 514/19.5 |
| 2005/0244819 A1* | 11/2005 | Cheng | ............ | C12Y 302/01023 435/456 |

* cited by examiner

*Primary Examiner* — Tadesse Hailu
(74) *Attorney, Agent, or Firm* — Keller Preece PLLC

(57) ABSTRACT

A method for designing a cell-based screening assay experiment includes, at a graphical user interface, receiving a first input identifying a template plate definition and receiving a second input defining a first group of disease reagents and at least one destination concentration of the disease reagents. The method also includes receiving a third input defining a first group of treatment reagents, at least one destination concentration for the treatment reagents, a number of replicates of the treatment reagents, and a selection to associate the first group of treatment reagents with the first group of disease reagents. The method further includes generating, based at least partially on the inputs, a design for the cell-based screening assay experiment, including determining a number of test wells required for performing the experiment, and distributing the test wells over a one or more test plates that are instances of the template plate definition.

20 Claims, 35 Drawing Sheets

Fig. 1M

| | A | B | C | D | E | F | G |
|---|---|---|---|---|---|---|---|
| | | 303 | 304 | 305 | 306 | 307 | 308 |
| 1 | 302 address | reagent_id | reagent_label | reagent_batch_name | rec_id | reagent_concentration_um | control |
| 2 | AA02 | Reagent 001 | RL1 | B1 | S1052 | c1 | FALSE |
| 3 | AA03 | Reagent 002 | RL2 | B2 | S0430 | c1 | FALSE |
| 4 | AA04 | Reagent 003 | RL3 | B3 | S0472 | c2 | FALSE |
| 5 | AA05 | Reagent 004 | RL4 | B4 | S4252 | c2 | FALSE |
| 6 | AA08 | Reagent 005 | RL5 | B5 | S1052 | c3 | FALSE |
| 7 | AA09 | Reagent 006 | RL6 | B6 | S0430 | c3 | FALSE |
| 8 | AA10 | Reagent 007 | RL7 | B7 | S0472 | c3 | FALSE |

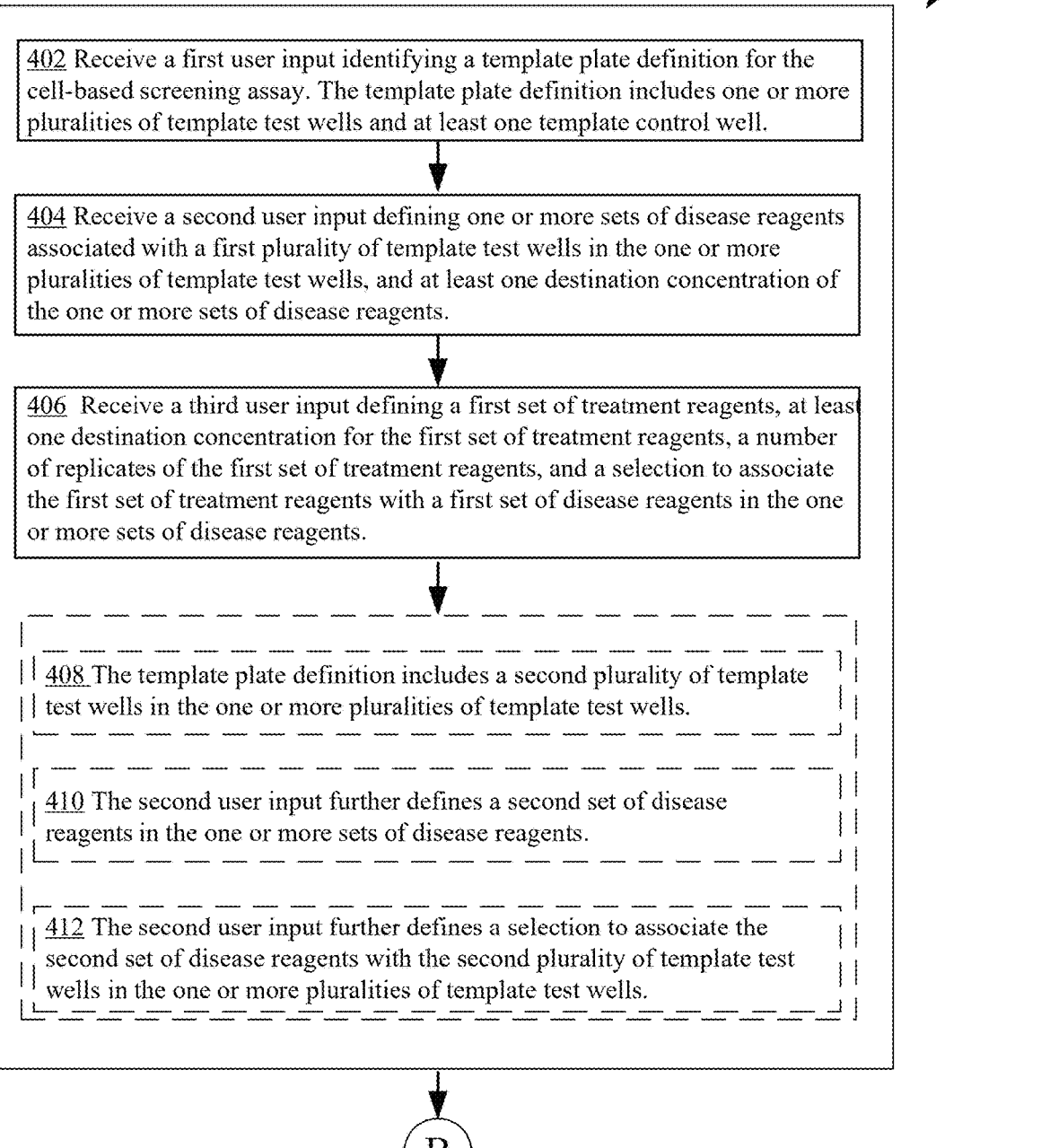

402 Receive a first user input identifying a template plate definition for the cell-based screening assay. The template plate definition includes one or more pluralities of template test wells and at least one template control well.

404 Receive a second user input defining one or more sets of disease reagents associated with a first plurality of template test wells in the one or more pluralities of template test wells, and at least one destination concentration of the one or more sets of disease reagents.

406 Receive a third user input defining a first set of treatment reagents, at least one destination concentration for the first set of treatment reagents, a number of replicates of the first set of treatment reagents, and a selection to associate the first set of treatment reagents with a first set of disease reagents in the one or more sets of disease reagents.

408 The template plate definition includes a second plurality of template test wells in the one or more pluralities of template test wells.

410 The second user input further defines a second set of disease reagents in the one or more sets of disease reagents.

412 The second user input further defines a selection to associate the second set of disease reagents with the second plurality of template test wells in the one or more pluralities of template test wells.

400

414 The first user input identifying the template plate definition for the cell-based screening assay includes (i) a number of wells assigned for the first plurality of template test wells and (ii) a number of wells assigned for the at least one template control well.

416 The first user input identifying the template plate definition for the cell-based screening assay includes (i) a final volume for each respective template test well in a first plurality of template test wells in the one or pluralities of template test wells (ii) a final volume for the at least one template control well.

418 The first user input identifying the template plate definition for the cell-based screening assay includes a number of rows of the template plate and a number of columns of the template plate.

420 The first user input identifying the template plate definition for the cell-based screening assay includes a number of edge rows for the template plate and a number of edge columns for the template plate. Wells located in the edge rows and in the edge columns are configured to remain empty during an experiment.

422 Display in response to receiving the first user input, a preview of the template plate.

424 The preview of the template plate includes graphical representations of (i) each template test well in the first plurality of template test wells and (ii) each template control well in the at least one template control well.

Fig. 4B

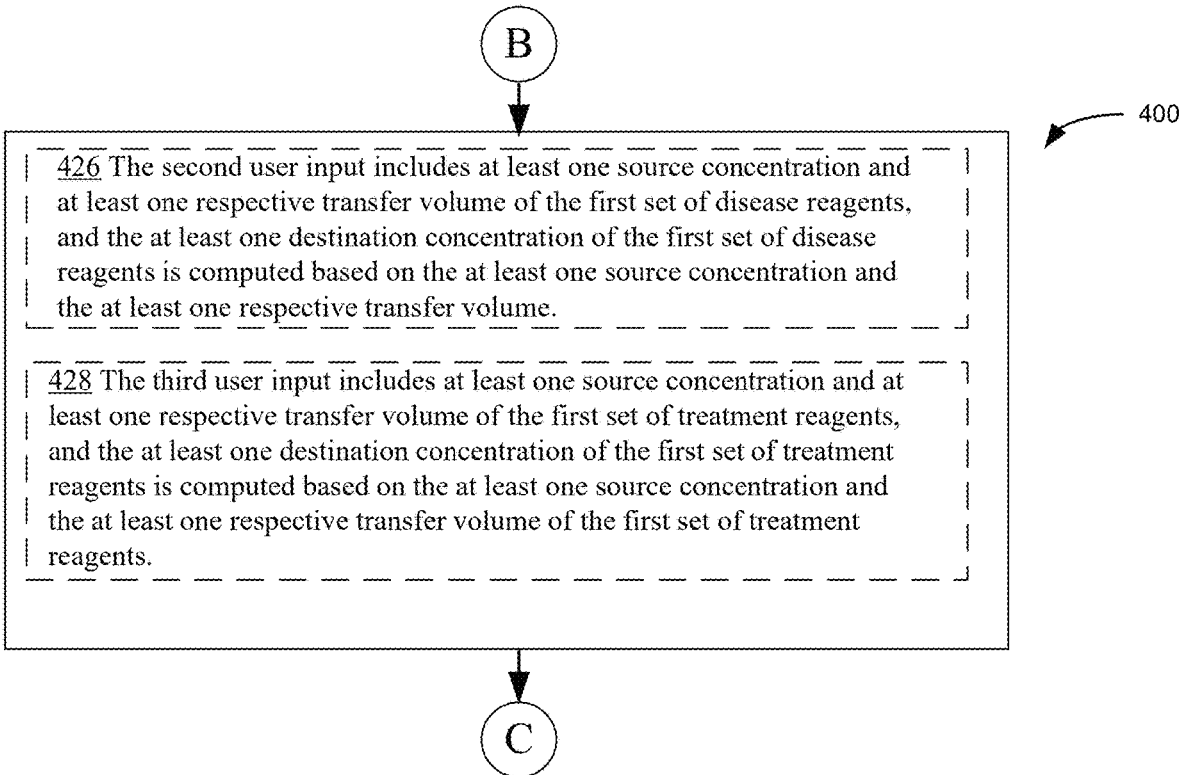

426 The second user input includes at least one source concentration and at least one respective transfer volume of the first set of disease reagents, and the at least one destination concentration of the first set of disease reagents is computed based on the at least one source concentration and the at least one respective transfer volume.

428 The third user input includes at least one source concentration and at least one respective transfer volume of the first set of treatment reagents, and the at least one destination concentration of the first set of treatment reagents is computed based on the at least one source concentration and the at least one respective transfer volume of the first set of treatment reagents.

Fig. 4C

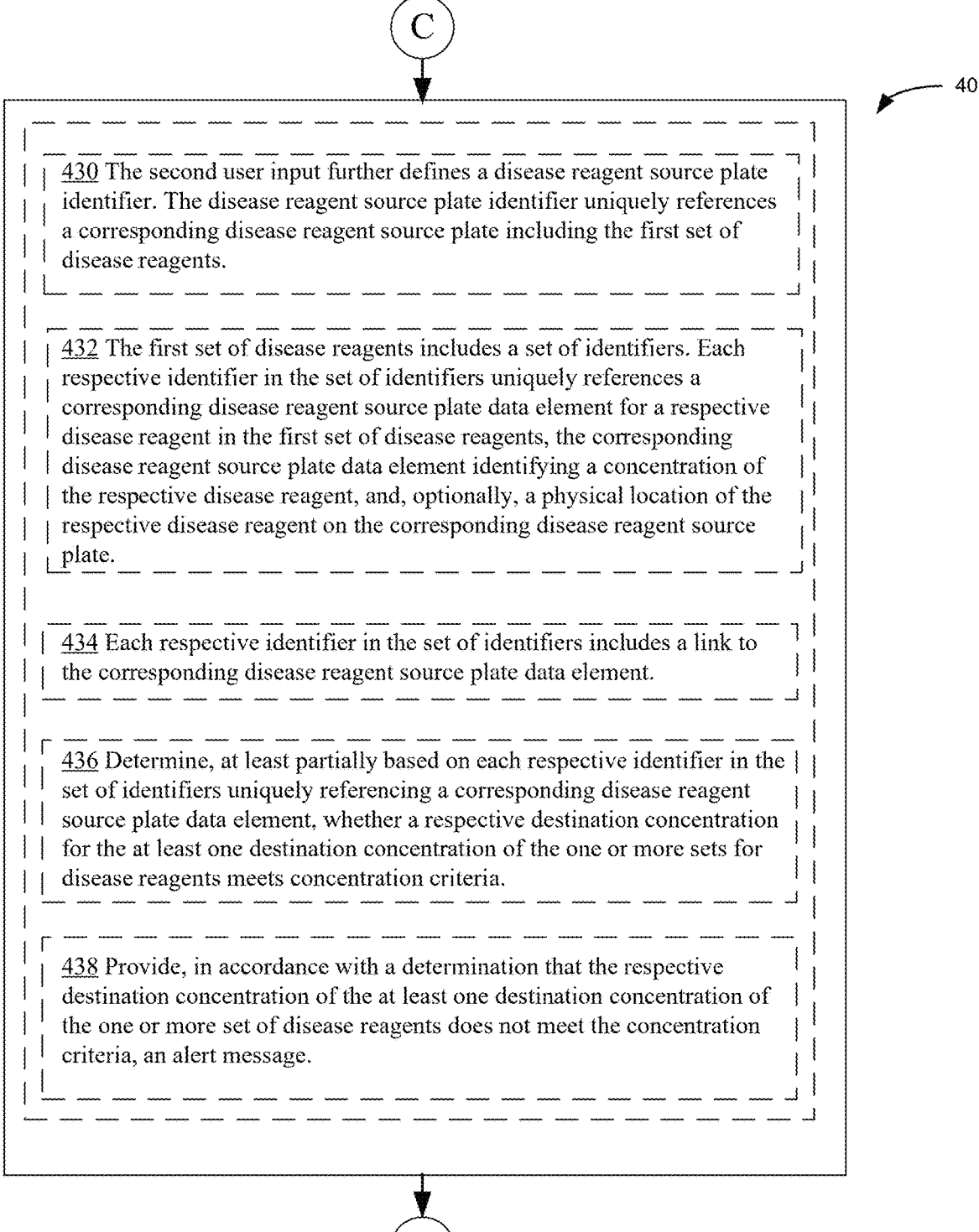

C

400

430 The second user input further defines a disease reagent source plate identifier. The disease reagent source plate identifier uniquely references a corresponding disease reagent source plate including the first set of disease reagents.

432 The first set of disease reagents includes a set of identifiers. Each respective identifier in the set of identifiers uniquely references a corresponding disease reagent source plate data element for a respective disease reagent in the first set of disease reagents, the corresponding disease reagent source plate data element identifying a concentration of the respective disease reagent, and, optionally, a physical location of the respective disease reagent on the corresponding disease reagent source plate.

434 Each respective identifier in the set of identifiers includes a link to the corresponding disease reagent source plate data element.

436 Determine, at least partially based on each respective identifier in the set of identifiers uniquely referencing a corresponding disease reagent source plate data element, whether a respective destination concentration for the at least one destination concentration of the one or more sets for disease reagents meets concentration criteria.

438 Provide, in accordance with a determination that the respective destination concentration of the at least one destination concentration of the one or more set of disease reagents does not meet the concentration criteria, an alert message.

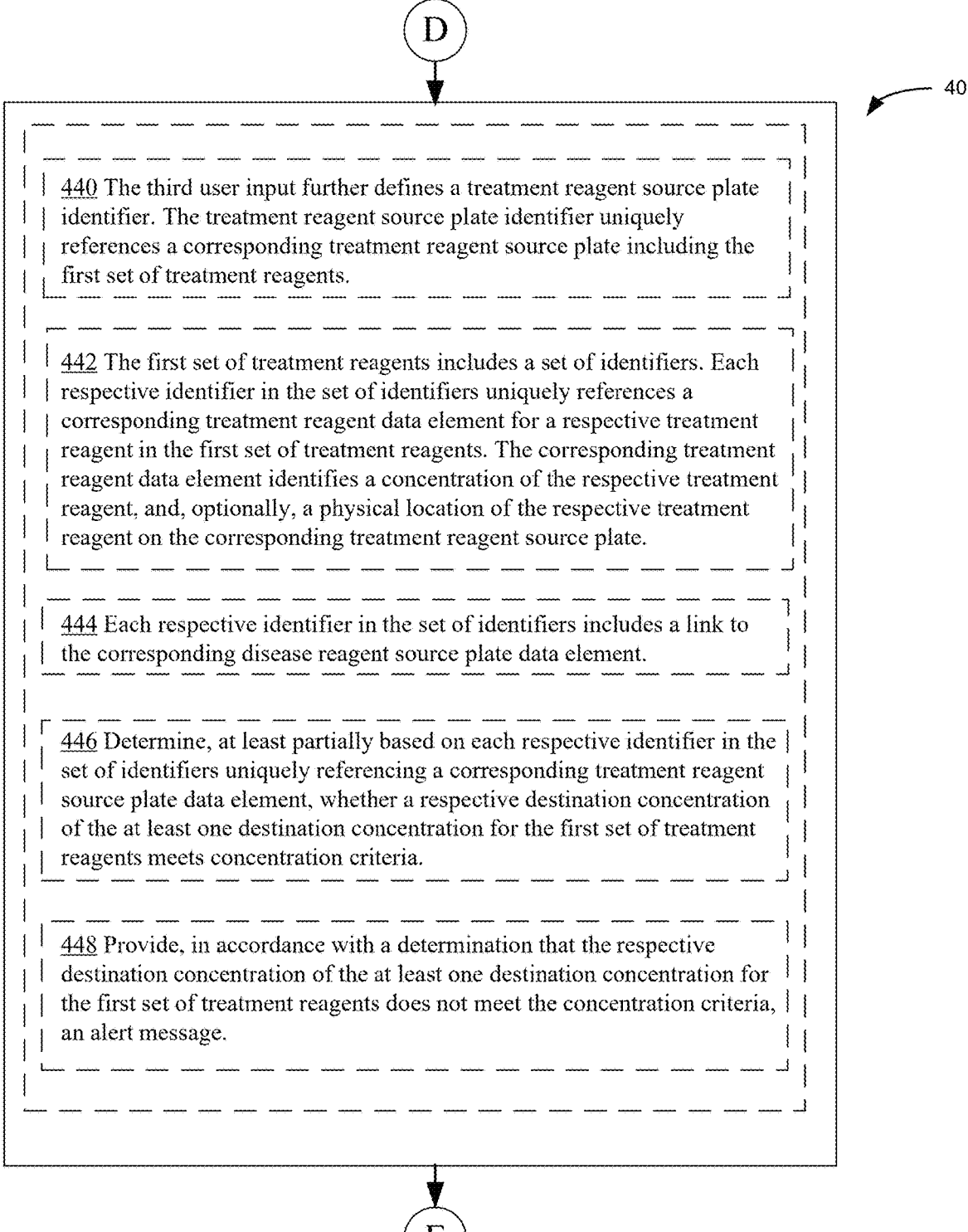

440 The third user input further defines a treatment reagent source plate identifier. The treatment reagent source plate identifier uniquely references a corresponding treatment reagent source plate including the first set of treatment reagents.

442 The first set of treatment reagents includes a set of identifiers. Each respective identifier in the set of identifiers uniquely references a corresponding treatment reagent data element for a respective treatment reagent in the first set of treatment reagents. The corresponding treatment reagent data element identifies a concentration of the respective treatment reagent, and, optionally, a physical location of the respective treatment reagent on the corresponding treatment reagent source plate.

444 Each respective identifier in the set of identifiers includes a link to the corresponding disease reagent source plate data element.

446 Determine, at least partially based on each respective identifier in the set of identifiers uniquely referencing a corresponding treatment reagent source plate data element, whether a respective destination concentration of the at least one destination concentration for the first set of treatment reagents meets concentration criteria.

448 Provide, in accordance with a determination that the respective destination concentration of the at least one destination concentration for the first set of treatment reagents does not meet the concentration criteria, an alert message.

Fig. 4E

400

450 The third user input further defines a second set of treatment reagents, at least one destination concentration of the second set of treatment reagents, a number of replicates of the second set of treatment reagents, and a selection to associate the second set of treatment reagents with the first set of disease reagents.

452 The third user input further defines an order for arranging the first plurality of test wells over the one or more test plates. The definition of the order for arranging the test wells includes defining a first resolve parameter and a second resolve parameter. The first resolve parameter and the second resolve parameter are each independently chosen from among the first set of treatment reagents, the at least one destination concentration for the first set of treatment reagents, and the replicates of the first set of treatment reagents and the first resolve parameter takes precedence over the second resolve parameter.

454 The definition of the order for arranging the test wells further includes defining a third resolve parameter. The second resolve parameter takes precedence over the third resolve parameter.

456 The first resolve parameter is chosen to be the first set of treatment reagents, the second resolve parameter is chosen to be the at least one destination concentration for the first set of treatment reagents, and the third resolve parameter is chosen to be the replicates of the first set of treatment reagents.

458 The second user input further defines an additional resolve parameter. The additional resolve parameter takes precedence over the first resolve parameter. The additional resolve parameter is chosen from among the one or more sets of disease reagents and the at least one destination concentration of the one or more sets of disease reagents.

Fig. 4F

400

460 Automatically generate, based at least partially on the first user input, the second user input and the third user input, a design for the cell-based screening assay.

462 The automatically generating includes (i) determining, from among the one or more pluralities of template test wells, a number of template test wells required for performing the cell-based screening assay experiment, thereby defining a first plurality of test wells in the design; and (ii) distributing the first plurality of test wells over one or more test plates in the design, wherein each test plate in the one or more test plates is an instance of the template plate definition.

464 The automatically generating the design for the cell-based screening assay experiment includes associating each test well of the first plurality of test wells with (1) a particular disease reagent of the first set of disease reagents in the one or more sets of disease reagents having a particular destination concentration of the at least one destination concentration of the first set of disease reagents, and (2) a particular treatment reagent of the first set of treatment reagents having a particular destination concentration of the at least one destination concentration for the first set of treatment reagents.

Fig. 4G

400

466 Receive an additional user input adding one or more additional disease reagents to the first set of disease reagents. The design for the cell-based screening assay is automatically generated based on additionally, at least partially on, the additional user input.

468 Receive an additional user input defining a first set of control reagents associated with the at least one template control well and at least one destination concentration of the first set of control reagents. The design for the cell-based screening assay is automatically generated based on additionally, at least partially on, the additional user input. The automatically generating further includes: (iii) determining a number of template control wells required for performing the cell-based screening assay experiment, thereby defining a first plurality of control wells; and (iv) distributing the first plurality of control wells over the one or more test plates required for performing the cell-based screening assay experiment.

470 The automatically generating the design for the cell-based screening assay experiment includes associating each control well of the first plurality of control wells with a particular control reagent of the first set of control reagents having a particular concentration of the at least one destination concentration of the first set of control reagents.

Fig. 4H

400

472 Receive an additional user input defining a backfill reagent. The automatically generating the design for the cell-based screening assay further includes determining a deficit for each test well in the first plurality of test wells and determining, based on the deficit for each test well in the first plurality of test wells, a transfer volume of the backfill reagent required to fill up each test well of the first plurality of test well so that each well of the first plurality of test well reaches a final volume.

474 Receive an additional user input on a first affordance of the graphical user interface and generate, in response to the additional user input, a plurality of tables describing the design for the cell-based screening assay. The plurality of tables includes two or more parameters defining the designed cell-based screening assay experiment. Each table of the plurality of tables represent the one or more parameters in a unique layout.

476 Display a plurality of affordances. Each affordance of the plurality of affordances corresponds to a table of the plurality of tables describing the design for the cell-based screening assay.

478 Each table of the plurality of tables includes the two or more parameters defining the designed cell-based screening assay experiment. The two or more parameters include two or more of the following: a test plate identification number, a disease reagent destination concentration, a treatment reagent destination concentration, a disease reagent count, a treatment reagent count, a disease reagent transfer volume, a treatment reagent transfer volume, a backfill transfer volume, a disease reagent transfer count, a treatment reagent transfer count and a backfill treatment reagent count.

480 In response to a user selection received on a particular affordance of the plurality of affordances, display a preview of a corresponding table of the plurality of tables describing the design for the cell-based screening assay.

Fig. 4I

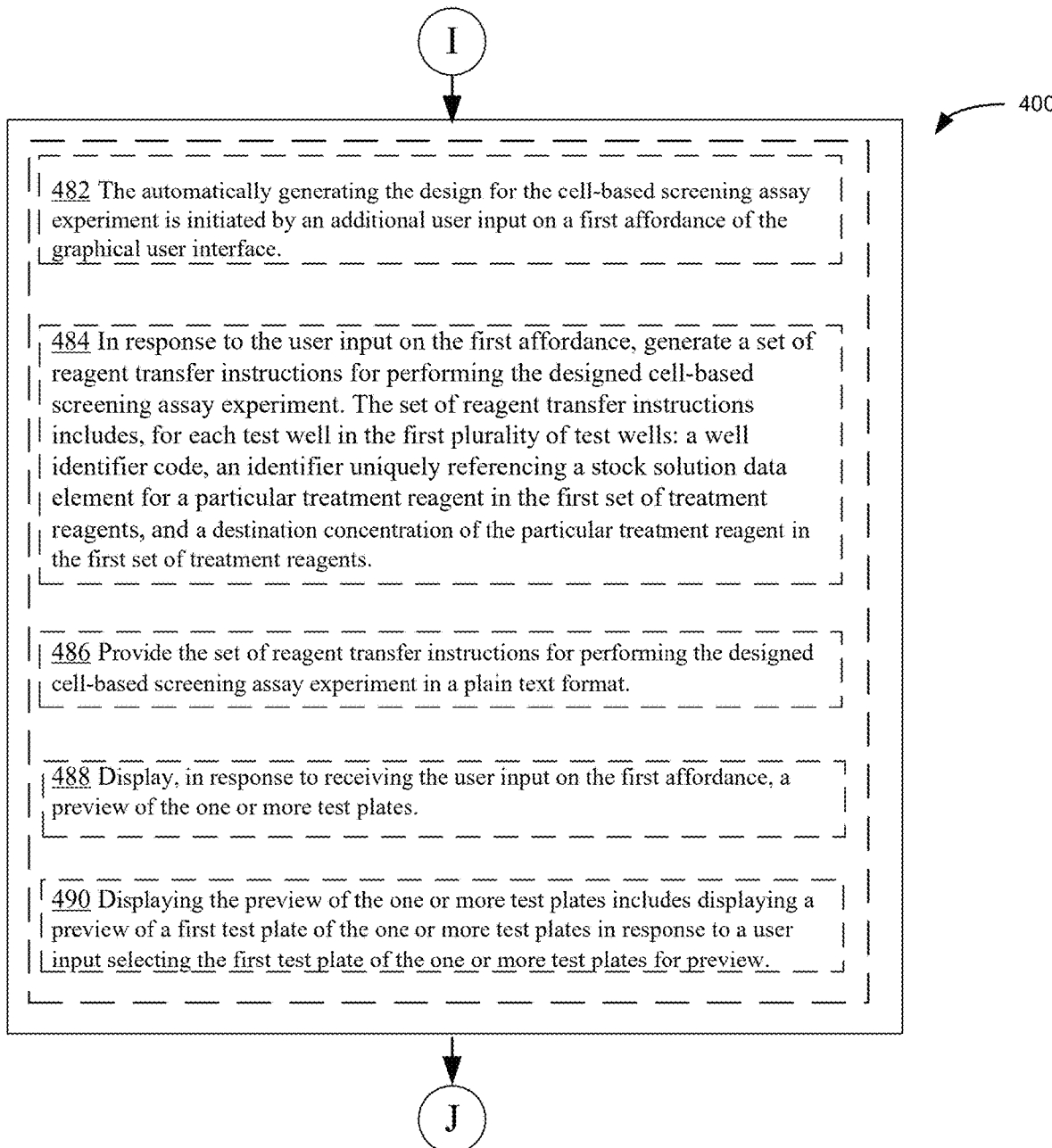

I

400

482 The automatically generating the design for the cell-based screening assay experiment is initiated by an additional user input on a first affordance of the graphical user interface.

484 In response to the user input on the first affordance, generate a set of reagent transfer instructions for performing the designed cell-based screening assay experiment. The set of reagent transfer instructions includes, for each test well in the first plurality of test wells: a well identifier code, an identifier uniquely referencing a stock solution data element for a particular treatment reagent in the first set of treatment reagents, and a destination concentration of the particular treatment reagent in the first set of treatment reagents.

486 Provide the set of reagent transfer instructions for performing the designed cell-based screening assay experiment in a plain text format.

488 Display, in response to receiving the user input on the first affordance, a preview of the one or more test plates.

490 Displaying the preview of the one or more test plates includes displaying a preview of a first test plate of the one or more test plates in response to a user input selecting the first test plate of the one or more test plates for preview.

METHODS AND USER INTERFACES FOR DESIGNING CELL-BASED SCREENING ASSAY EXPERIMENTS

TECHNICAL FIELD

The present disclosure relates generally to systems, methods, and interfaces for designing cell-based screening assay experiments.

BACKGROUND

High throughput screening (HTS) is a process used in pharmaceutical drug discovery to test large compound libraries containing thousands to millions of compounds for various biological effects. HTS typically uses robotics, such as liquid handlers and automated imaging devices, to conduct testing of large compound libraries, such as biochemical, genetic, and/or phenotypical libraries, in multi-well plates (e.g., 96-well, 384-well, 1536-well, or 3456-well plates). In this fashion, lead-compounds that provide a desired biochemical, genetic, or phenotypic effect can be quickly identified from the compound libraries, for further testing and development towards the goal of discovering a new pharmaceutical agent for disease treatment. For a review of basic HTS methodologies see, for example, Wildey M J et al., "Chapter Five—High-Throughput Screening," Annual Reports in Medicinal Chemistry, Academic Press, 50:149-95 (2017), which is hereby incorporated by reference. Cell-based HTS is a particular subcategory of assay screening that aims to identify modulators of disease pathways of interest in a more physiological environment of a cell. For a review of cell-based HTS methodologies see, for example, An F. W. and Tolliday N., "Cell-Based Assays for High-Throughput Screening," Molecular Biotechnology 45(2):180-6 (2010) which is hereby incorporated by reference. Recent advances in optics, robotics and computational techniques, as well as an expanding repertoire of contrast markers, including functional live-cell reporters, have contributed to the widespread adoption of image-based screening platforms. See Bickle, 2010, "The beautiful cell: high-content screening in drug discovery," Anal. Bioanal Chem. 398, 219-226; Isherwood et al., 2011, "Live cell in vitro and in vivo imaging applications: accelerating drug discovery," Pharmaceutics 3, 141-170 (2011); and Kummel et al., 2010, "Integration of multiple readouts into the z' factor for assay quality assessment," J. Biomol. Screen 15, 95-101.

Consequently, the advancements in automated methods for performing large scale cell-based HTS experiments have created fundamental challenges in designing experiments including combinatorial complexities. In order to perform reliable HTS experiments, input metadata for an experiment (e.g., including disease reagents, treatment reagents, control reagents, concentrations, source plates, number of replicates, an order of distributing test wells over test plates, etc.) is processed to generate a combinatorial experiment design that satisfies requirements for reliable analyses. For example, an experiment design takes into consideration a number of replicates required for testing one or more treatment reagents against a disease reagent, and how the number of replicates are positionally distributed over a large number of screening plates in order to obtain statistically valid results. As amount of metadata increases, the complexity of the experiments multiplies. For example, the number of test plates in a typical cell-based HTS experiment ranges from a few test plates to more than a hundred test plates. Designing such experiments is time-consuming and expensive.

SUMMARY

Given the above background, what is needed in the art are methods and user interfaces for designing cell-based HTS experiments efficiently and reliably. In particular, such methods and user interfaces should provide an easy platform of adding input metadata, manipulating the input metadata, and processing the input metadata to generate combinatorial experiment metadata.

The present disclosure addresses, among others, a need in the art for user interfaces providing a visual platform for entering input metadata for performing a cell-based HTS assay experiment and an automated system for generating experiment metadata based the input metadata. Additionally, the user interface includes a visual preview of the designed experiment metadata for easy review and inspection. The methods and interfaces of the present disclosure provide for an efficient way of designing cell-based screening assay experiments. The methods and interfaces of the present disclosure further increase the reliability of the experiments, by providing means for easy manipulation and reviewing of the designed experiment. The present disclosure reduces the time, and therefore cost, associated with designing cell-based HTS assays.

In accordance with some embodiments, a method for designing a cell-based screening assay experiment includes, at a graphical user interface, receiving a first user input identifying a template plate definition for the cell-based screening assay. The template plate definition includes (provides a description of) one or more pluralities of template test wells and at least one template control well. The method includes receiving a second user input defining (A) one or more sets of disease reagents associated with a first plurality of template test wells in the one or more pluralities of template test wells, and (B) at least one destination concentration for the one or more sets of disease reagents. The method includes receiving a third user input defining (A) a first set of treatment reagents, (B) at least one destination concentration for the first set of treatment reagents, (C) a number of replicates of the first set of treatment reagents, and (D) a selection to associate the first set of treatment reagents with a first set of disease reagents in the one or more sets of disease reagents. The method further includes automatically generating, based at least partially on the first user input, the second user input and the third user input, a design for the cell-based screening assay. The automatically generating includes determining, from among the one or more pluralities of template test wells, a number of template test wells required for performing the cell-based screening assay experiment, thereby defining a first plurality of test wells in the design. The automatically generating also includes distributing the first plurality of test wells over one or more test plates in the design. Each test plate in the one or more test plates is an instance of the template plate definition.

In some embodiments, the template plate definition includes a second plurality of template test wells in the one or more pluralities of template test wells. In such embodiments, the second user input further defines a second set of disease reagents in the one or more sets of disease reagents and a selection to associate the second set of disease reagents with the second plurality of template test wells in the one or more pluralities of template test wells.

In some embodiments, the third user input further defines a second set of treatment reagents, at least one destination concentration of the second set of treatment reagents, a number of replicates of the second set of treatment reagents, and a selection to associate the second set of treatment reagents with the first set of disease reagents.

In some embodiments, the method further includes receiving an additional user input adding one or more additional disease reagents to the first set of disease reagents. The design for the cell-based screening assay is automatically generated based on additionally, at least partially, the additional user input.

In some embodiments, automatically generating the design for the cell-based screening assay experiment includes associating each test well of the first plurality of test wells with a particular disease reagent of the first set of disease reagents in the one or more sets of disease reagents having a particular destination concentration of the at least one destination concentration of the first set of disease reagents, and a particular treatment reagent of the first set of treatment reagents having a particular destination concentration of the at least one destination concentration for the first set of treatment reagents.

In some embodiments, the method further includes receiving an additional user input defining a first set of control reagents associated with the at least one template control well and at least one destination concentration of the first set of control reagents. The design for the cell-based screening assay is automatically generated based on additionally, at least partially, the additional user input. The automatically generating further includes determining a number of template control wells required for performing the cell-based screening assay experiment, thereby defining a first plurality of control wells. The automatically generating also includes distributing the first plurality of control wells over the one or more test plates required for performing the cell-based screening assay experiment.

In some embodiments, the automatically generating the design for the cell-based screening assay experiment includes associating each control well of the first plurality of control wells with a particular control reagent of the first set of control reagents having a particular concentration of the at least one destination concentration of the first set of control reagents.

In some embodiments, the third user input includes at least one source concentration and at least one respective transfer volume of the first set of disease reagents. The at least one destination concentration of the first set of disease reagents is computed based on the at least one source concentration and the at least one respective transfer volume.

In some embodiments, the second user input includes at least one source concentration and at least one respective transfer volume of the first set of treatment reagents. The at least one destination concentration of the first set of treatment reagents is computed based on the at least one source concentration and the at least one respective transfer volume of the first set of treatment reagents.

In some embodiments, the second user input further defines a disease reagent source plate identifier. The disease reagent source plate identifier uniquely references a corresponding disease reagent source plate including the first set of disease reagents.

In some embodiments, the first set of disease reagents includes a set of identifiers. Each respective identifier in the set of identifiers uniquely references a corresponding disease reagent source plate data element for a respective disease reagent in the first set of disease reagents. The corresponding disease reagent source plate data element identifies a concentration of the respective disease reagent, and, optionally, a physical location of the respective disease reagent on the corresponding disease reagent source plate.

In some embodiments, each respective identifier in the set of identifiers includes a link to the corresponding disease reagent source plate data element.

In some embodiments, the method further includes determining, at least partially based on each respective identifier in the set of identifiers uniquely referencing a corresponding disease reagent source plate data element, whether a respective destination concentration for the at least one destination concentration of the one or more sets for disease reagents meets concentration criteria. The method also includes providing, in accordance with a determination that the respective destination concentration of the at least one destination concentration of the one or more set of disease reagents does not meet the concentration criteria, an alert message.

In some embodiments, the third user input further defines a treatment reagent source plate identifier. The treatment reagent source plate identifier uniquely references a corresponding treatment reagent source plate including the first set of treatment reagents.

In some embodiments, the first set of treatment reagents includes a set of identifiers. Each respective identifier in the set of identifiers uniquely references a corresponding treatment reagent data element for a respective treatment reagent in the first set of treatment reagents. The corresponding treatment reagent data element identifies a concentration of the respective treatment reagent, and, optionally, a physical location of the respective treatment reagent on the corresponding treatment reagent source plate.

In some embodiments, each respective identifier in the set of identifiers includes a link to the corresponding disease reagent source plate data element.

In some embodiments, the method further includes determining, at least partially based on each respective identifier in the set of identifiers uniquely referencing a corresponding treatment reagent source plate data element, whether a respective destination concentration of the at least one destination concentration for the first set of treatment reagents meets concentration criteria. The method also includes providing, in accordance with a determination that the respective destination concentration of the at least one destination concentration for the first set of treatment reagents does not meet the concentration criteria, an alert message.

In some embodiments, the third user input further defines an order for arranging the first plurality of test wells over the one or more test plates. The definition of the order for arranging the test wells includes defining a first resolve parameter and a second resolve parameter. The first resolve parameter and the second resolve parameter are each independently chosen from among the first set of treatment reagents, the at least one destination concentration for the first set of treatment reagents, and the replicates of the first set of treatment reagents. The first resolve parameter takes precedence over the second resolve parameter.

In some embodiments, the definition of the order for arranging the test wells further includes defining a third resolve parameter. The second resolve parameter takes precedence over the third resolve parameter. In some embodiments, the first resolve parameter is chosen to be the first set of treatment reagents, the second resolve parameter is chosen to be the at least one destination concentration for the first set of treatment reagents, and the third resolve parameter is chosen to be the replicates of the first set of treatment reagents.

In some embodiments, the second user input further defines an additional resolve parameter. The additional resolve parameter takes precedence over the first resolve parameter. The additional resolve parameter is chosen from among the one or more sets of disease reagents and the at least one destination concentration for the one or more sets of disease reagents.

In some embodiments, the first user input identifying the template plate definition for the cell-based screening assay includes a number of wells assigned for the first plurality of template test wells and a number of wells assigned for the at least one template control well.

In some embodiments, the first user input identifying the template plate definition for the cell-based screening assay includes a final volume for each respective template test well in a first plurality of template test wells in the one or pluralities of template test wells a final volume for the at least one template control well.

In some embodiments, the first user input identifying the template plate definition for the cell-based screening assay includes a number of rows of the template plate and a number of columns of the template plate.

In some embodiments, the first user input identifying the template plate definition for the cell-based screening assay includes a number of edge rows for the template plate and a number of edge columns for the template plate. The wells located in the edge rows and in the edge columns are configured to remain empty during an experiment.

In some embodiments, the method further includes displaying, in response to receiving the first user input, a preview of the template plate.

In some embodiments, the preview of the template plate includes graphical representations of each template test well in the first plurality of template test wells and each template control well in the at least one template control well.

In some embodiments, the method further includes receiving an additional user input defining a backfill reagent. The automatically generating the design for the cell-based screening assay further includes determining a deficit for each test well in the first plurality of test wells. In such embodiments, the automatically generating also includes determining, based on the deficit for each test well in the first plurality of test wells, a transfer volume of the backfill reagent required to fill up each test well of the first plurality of test well so that each well of the first plurality of test well reaches a final volume.

In some embodiments, the automatically generating the design for the cell-based screening assay experiment is initiated by an additional user input on a first affordance of the graphical user interface.

In some embodiments, the method further includes, in response to the user input on the first affordance, generating a set of reagent transfer instructions for performing the designed cell-based screening assay experiment. The set of reagent transfer instructions include, for each test well in the first plurality of test wells a well identifier code, an identifier uniquely referencing a stock solution data element for a particular treatment reagent in the first set of treatment reagents, and a destination concentration of the particular treatment reagent in the first set of treatment reagents.

In some embodiments, the method further includes providing the set of reagent transfer instructions for performing the designed cell-based screening assay experiment in a plain text format.

In some embodiments, the method further includes displaying, in response to receiving the user input on the first affordance, a preview of the one or more test plates.

In some embodiments, displaying the preview of the one or more test plates includes displaying a preview of a first test plate of the one or more test plates in response to a user input selecting the first test plate of the one or more test plates for preview.

In some embodiments, the preview of the one or more test plates includes graphical representations of each respective test well in the first plurality of the test wells. In such embodiments, each respective test well is associated with (1) a particular disease reagent of the first set of disease reagents of the one or more sets of disease reagents having a particular concentration of the at least one destination concentration of the first set of disease reagents, and (2) a particular treatment reagent of the first set of treatment reagents having a particular destination concentration of the at least one destination concentration for the first set of treatment reagents.

In some embodiments, the method further includes, while displaying the preview of the one or more test plates, receiving an additional user input, through the graphical user interface, for altering the displayed preview of the one or more test plates.

In some embodiments, the altering the displayed preview of the one or more test plates includes shuffling the order or deleting one or more test wells in the first plurality of test wells that are within a test plate in the one or more test plates.

In some embodiments, the preview of the one or more test plates further includes a graphical representation of each control well of the at least one control well.

In some embodiments, the method further includes receiving an additional user input on a first affordance of the graphical user interface. The method includes generating, in response to the additional user input, a plurality of tables describing the designed cell-based screening assay experiment. The plurality of tables includes two or more parameters defining the designed cell-based screening assay experiment. Each table of the plurality of tables represents the one or more parameters in a unique layout. The method includes displaying a plurality of affordances. Each affordance of the plurality of affordances corresponds to a table of the plurality of tables describing the design for the cell-based screening assay. Each table of the plurality of tables includes the two or more parameters defining the designed cell-based screening assay experiment. The two or more parameters include two or more of the following: a test plate identification number, a disease reagent destination concentration, a treatment reagent destination concentration, a disease reagent count, a treatment reagent count, a disease reagent transfer volume, a treatment reagent transfer volume, a backfill transfer volume, a disease reagent transfer count, a treatment reagent transfer count and a backfill treatment reagent count. In response to a user selection received on a particular affordance of the plurality of affordances, the method includes displaying a preview of a corresponding table of the plurality of tables describing the design for the cell-based screening assay.

Another aspect of the present disclosure provides a system for designing a cell-based screening assay experiment includes at least one processor and memory addressable by the at least one processor. The memory stores at least one program for execution by the at least one processor. The at least one program includes instructions for displaying a graphical user interface. The instructions also include, at the graphical user interface, receiving a first user input identifying a template plate definition for the cell-based screening assay. The template plate definition including one or more pluralities of template test wells and at least one template control well. The instructions include receiving a second user input defining one or more sets of disease reagents associated with a first plurality of template test wells in the one or more pluralities of template test wells, and at least one destination concentration for the one or more sets of disease reagents. The instructions include receiving a third user input defining a first set of treatment reagents, at least one destination concentration for the first set of treatment reagents, a number of replicates of the first set of treatment reagents, and a selection to associate the first set of treatment reagents with a first set of disease reagents in the one or more sets of disease reagents. The instructions further include automatically generating, based at least partially on the first user input, the second user input and the third user input, a design for the cell-based screening assay. The automatically generating includes determining, from among the one or more pluralities of template test wells, a number of template test wells required for performing the cell-based screening assay experiment, thereby defining a first plurality of test wells in the design. The automatically generating also includes distributing the first plurality of test wells over one or more test plates in the design. Each test plate in the one or more test plates is an instance of the template plate definition.

Still another aspect of the present disclosure provides a non-transitory computer readable media stores one or more programs. The one or more programs include instructions, which when executed by an electronic device with a display cause the device to display a graphical user interface and at the graphical user interface receive a first user input identifying a template plate definition for the cell-based screening assay. The template plate definition includes one or more pluralities of template test wells and at least one template control well. The instructions cause the device to receive a second user input defining one or more sets of disease reagents associated with a first plurality of template test wells in the one or more pluralities of template test wells, and at least one destination concentration for the one or more sets of disease reagents. The instructions cause the device to receive a third user input defining a first set of treatment reagents, at least one destination concentration for the first set of treatment reagents, a number of replicates of the first set of treatment reagents, and a selection to associate the first set of treatment reagents with a first set of disease reagents in the one or more sets of disease reagents. The instructions also cause the device to automatically generate, based at least partially on the first user input, the second user input and the third user input, a design for the cell-based screening assay. The automatically generating includes determining, from among the one or more pluralities of template test wells, a number of template test wells required for performing the cell-based screening assay experiment, thereby defining a first plurality of test wells in the design. The automatically generating also includes distributing the first plurality of test wells over one or more test plates in the design. Each test plate in the one or more test plates is an instance of the template plate definition.

BRIEF DESCRIPTION OF THE DRAWINGS

FIG. 1M is a portion of the third section of the user interface of FIG. 1K enlarged for magnification purposes.

FIG. 3 is an exemplary illustration of liquid transfer instructions in accordance with some embodiments.

FIGS. 4A-4K illustrate flow charts describing a method for designing cell-based screening assay experiments in accordance with some embodiments.

Like reference numerals refer to corresponding parts throughout the several views of the drawings.

DETAILED DESCRIPTION

Figure 1A:
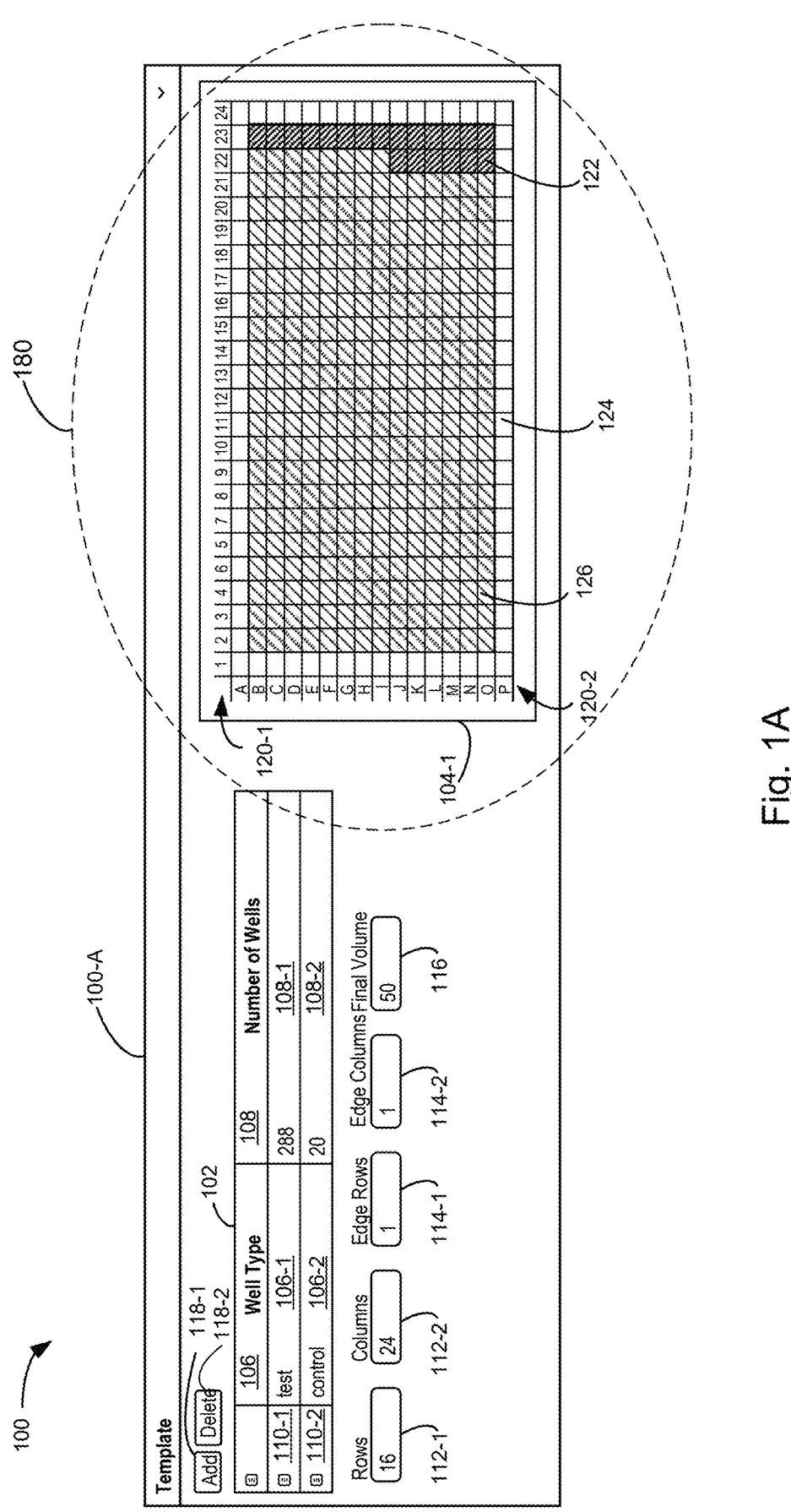
FIG. 1A is an exemplary illustration of a first section of a user interface for designing cell-based screening assay experiments in accordance with some embodiments.
Figure 1B:
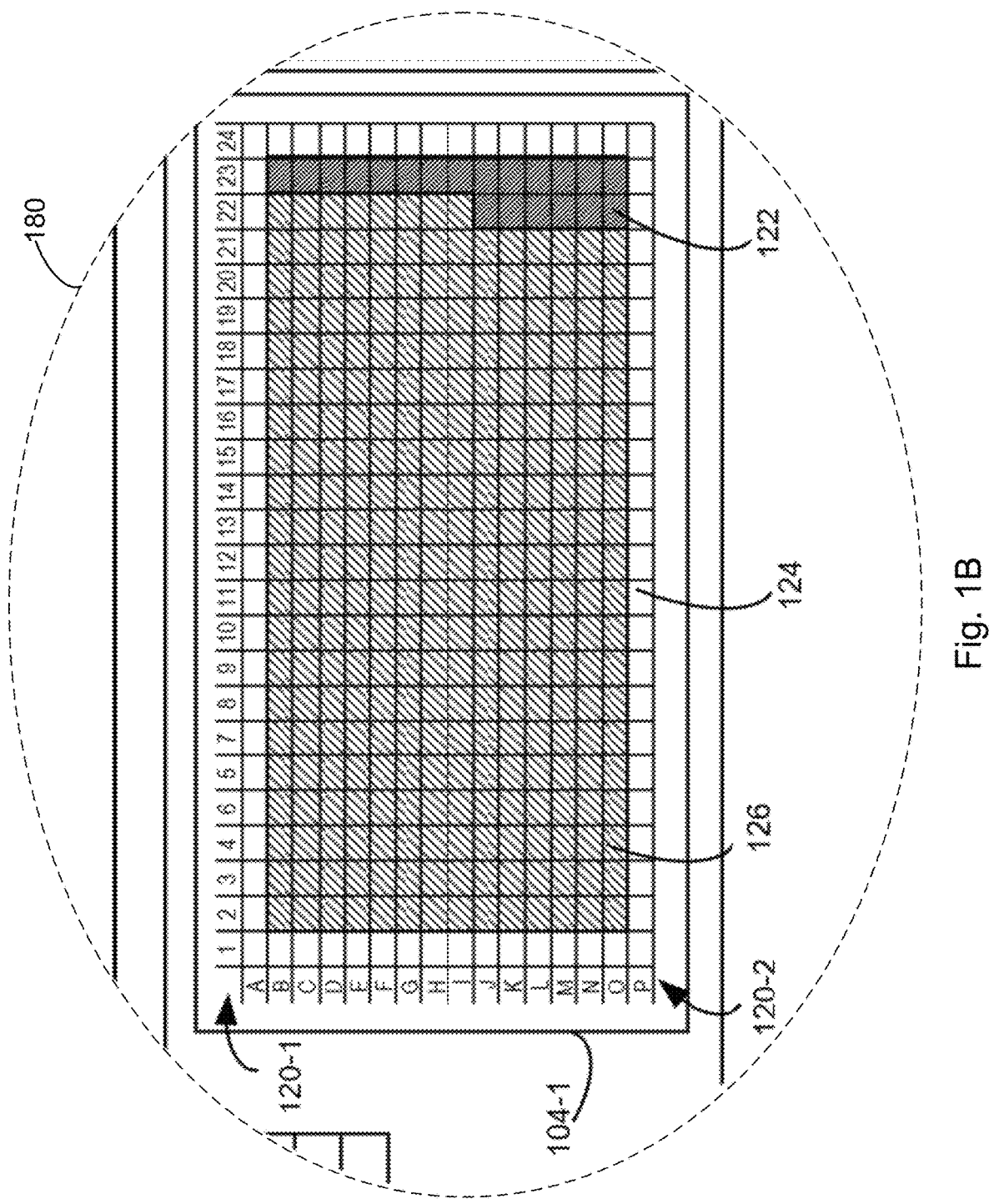
FIG. 1B is a portion of the first section of the user interface of FIG. 1A enlarged for magnification purposes.
Figure 1C:
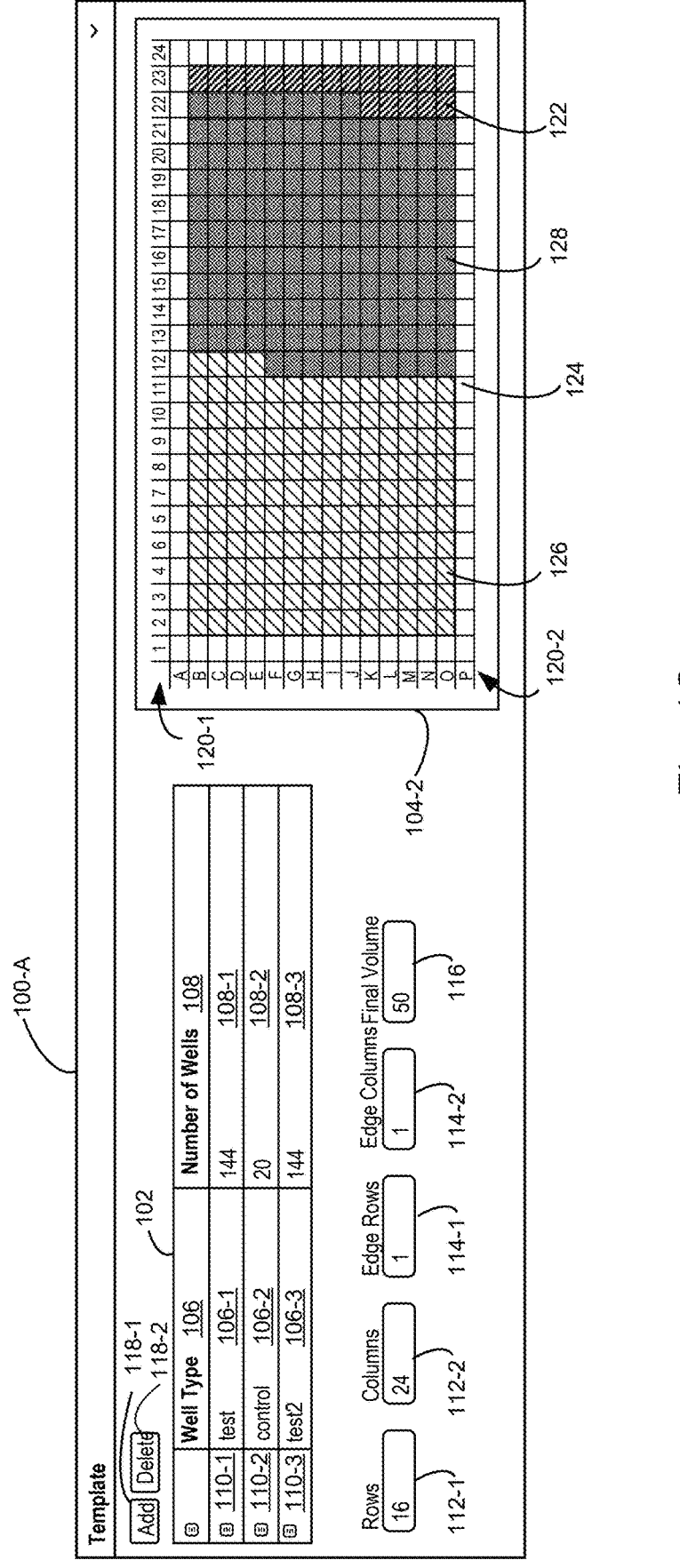
FIG. 1C is another exemplary illustration of a first section of a user interface for designing cell-based screening assay experiments in accordance with some embodiments.

Referring to FIGS. 1A-1C, the present disclosure provides for a user interface and methods for designing cell-based HTS assays efficiently, reliably, and economically. As will be described below in detail, the present disclosure provides a visual platform for entering and manipulating input metadata for designing a cell-based HTS assay experiment. In particular, the interface of the present disclosure allows a user to separately enter and manipulate experiment metadata defining what goes into test wells (e.g., defining one or more disease reagents, one or more treatment reagents, respective source plates, and one or more respective destination concentrations for the reagents), and how the test wells are distributed (e.g., resolved) over the test plates. Such separation enables a convenient and fast definition and manipulation of the input metadata. The input metadata provided by the user is then automatically processed to create combinatorial experiment metadata. The benefits of the interface and method of the present disclosure are emphasized especially for complex screening assay experiments including a large number of reagent combinations. The present disclosure provides means for designing cell-based HTS assays significantly faster than conventional experiment design methods, thereby saving costly manpower required for designing such experiments. For example, an experiment that would take 6-8 hours to design using conventional computer-based platforms can be designed in less than an hour using the interface and methods of the present disclosure.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject," "user," and "patient" are used interchangeably herein. By the term insulin pen is meant an injection device suitable for applying discrete doses of insulin, where the injection device is adapted for logging and communicating dose related data.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1D:
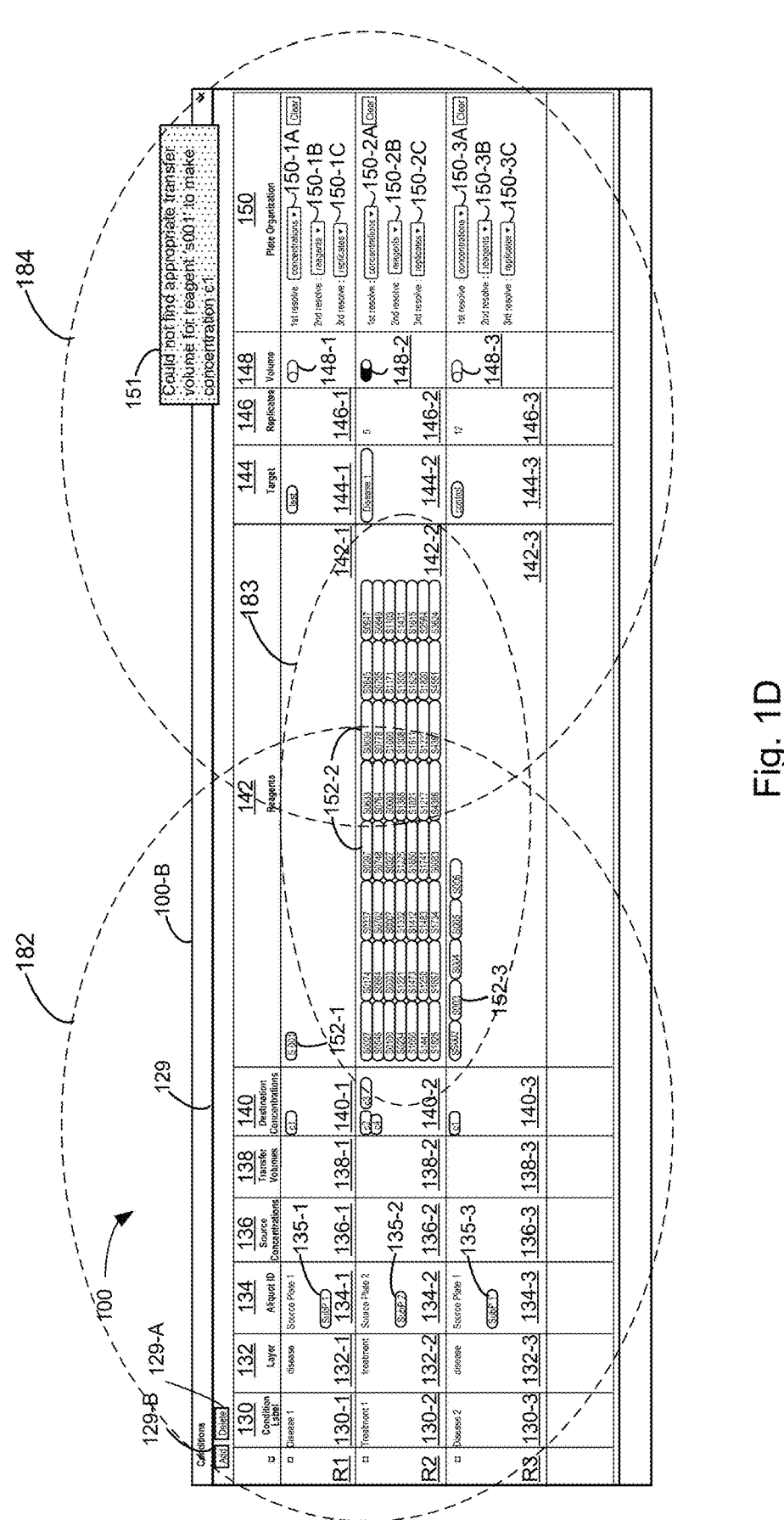
FIG. 1D is an exemplary illustration of a second section of a user interface for designing cell-based screening assay experiments in accordance with some embodiments.
Figure 1E:
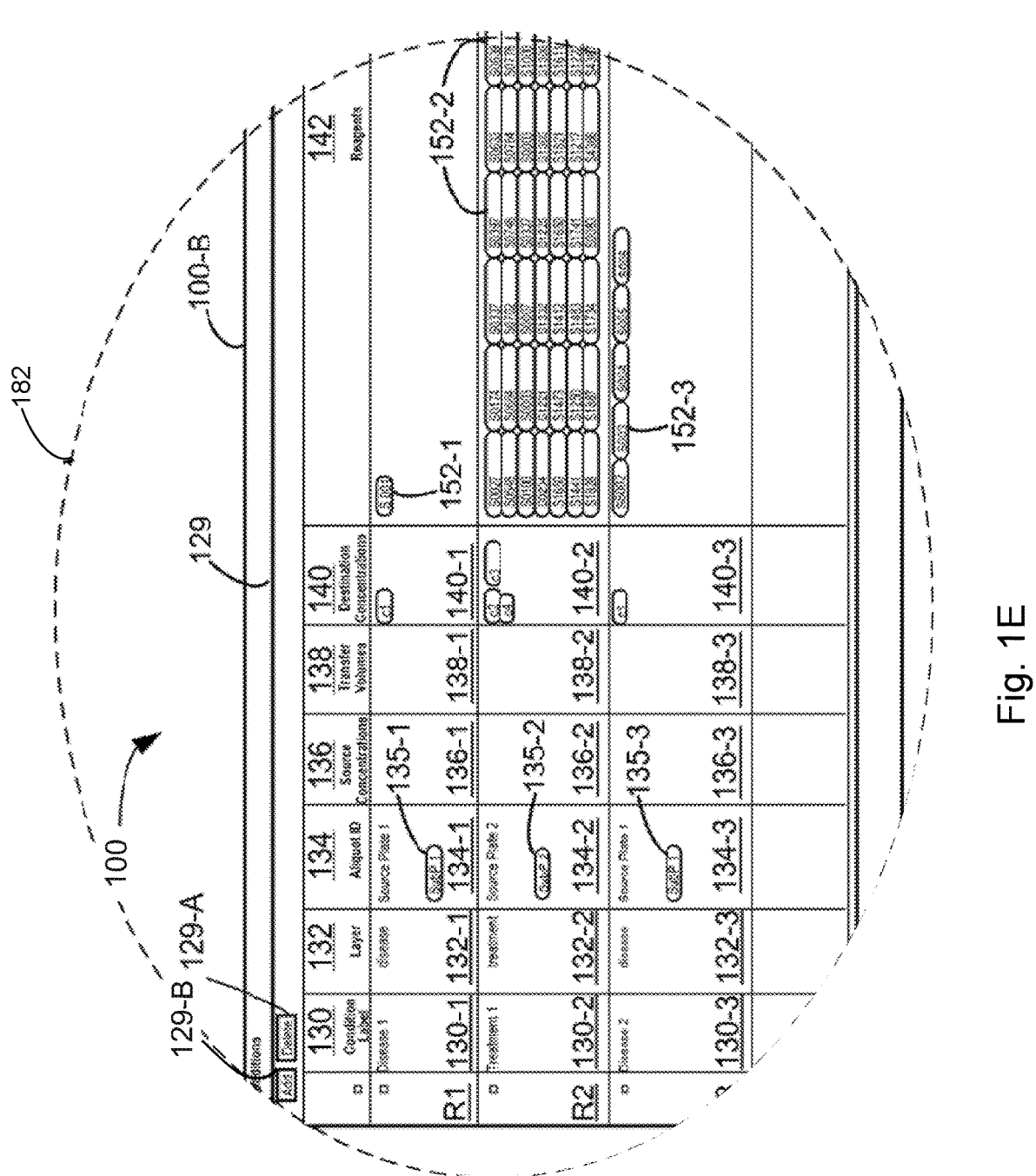
FIG. 1E is a portion of the first section of the user interface of FIG. 1D enlarged for magnification purposes.
Figure 1F:
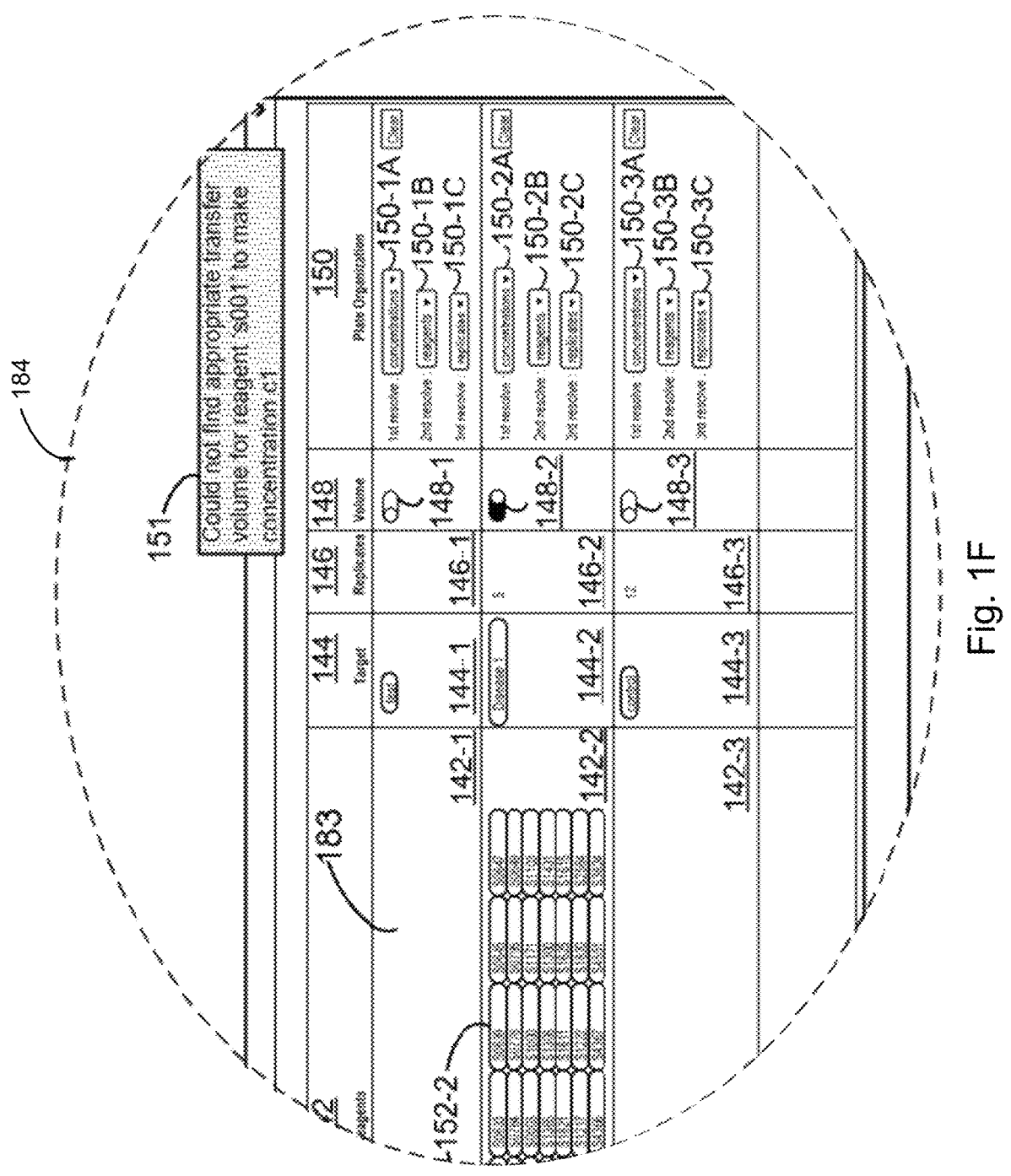
FIG. 1F is a portion of the first section of the user interface of FIG. 1D enlarged for magnification purposes.
Figure 1G:
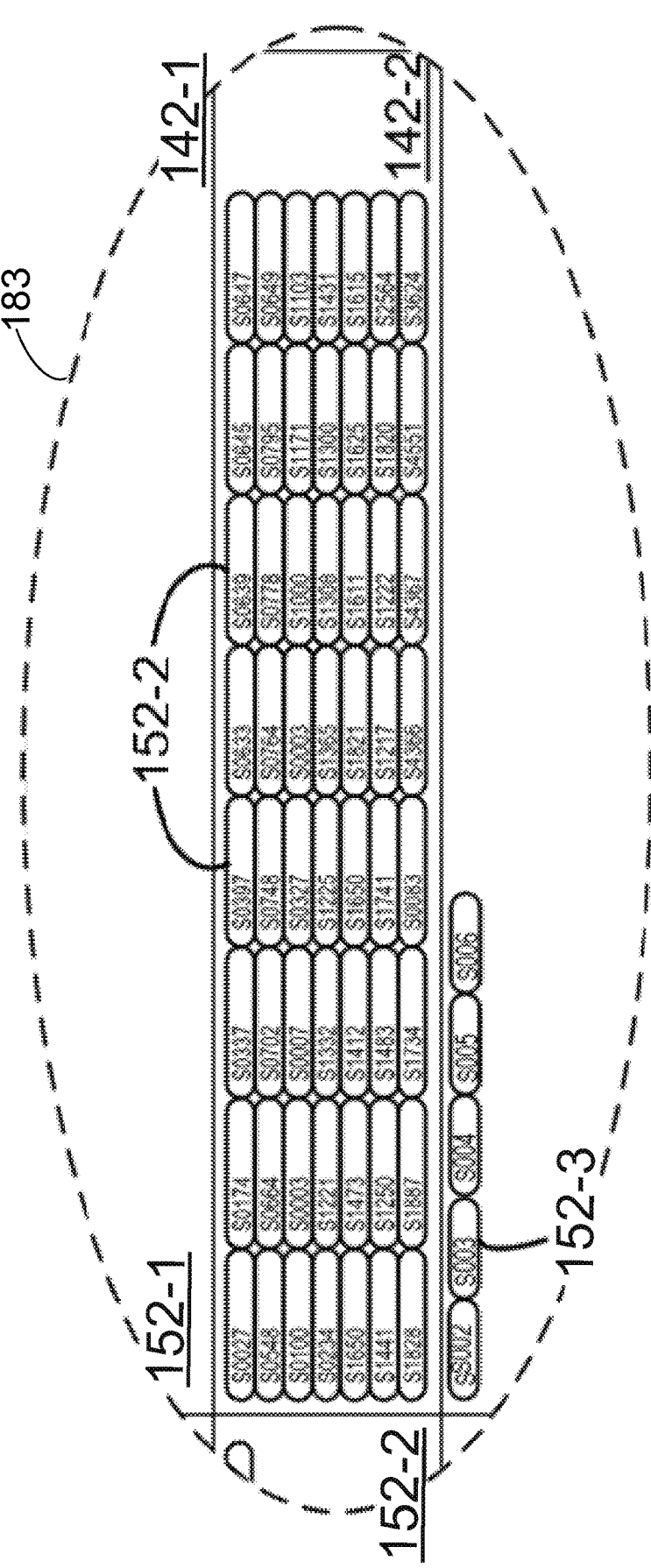
FIG. 1G is a portion of the first section of the user interface of FIG. 1D enlarged for magnification purposes.
Figure 1H:
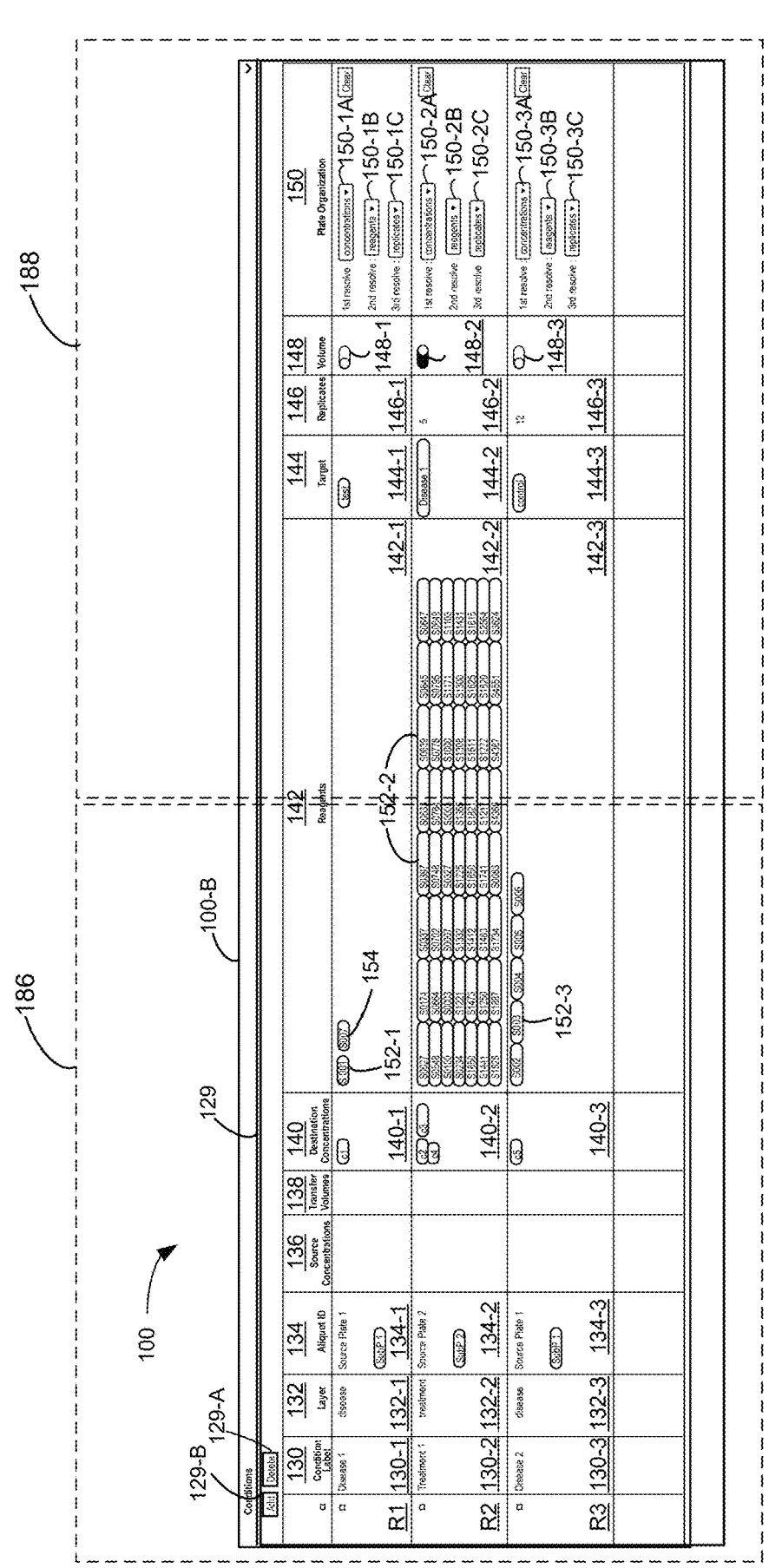
FIG. 1H is an exemplary illustration of a second section of a user interface for designing cell-based screening assay experiments in accordance with some embodiments.
Figure 1I:
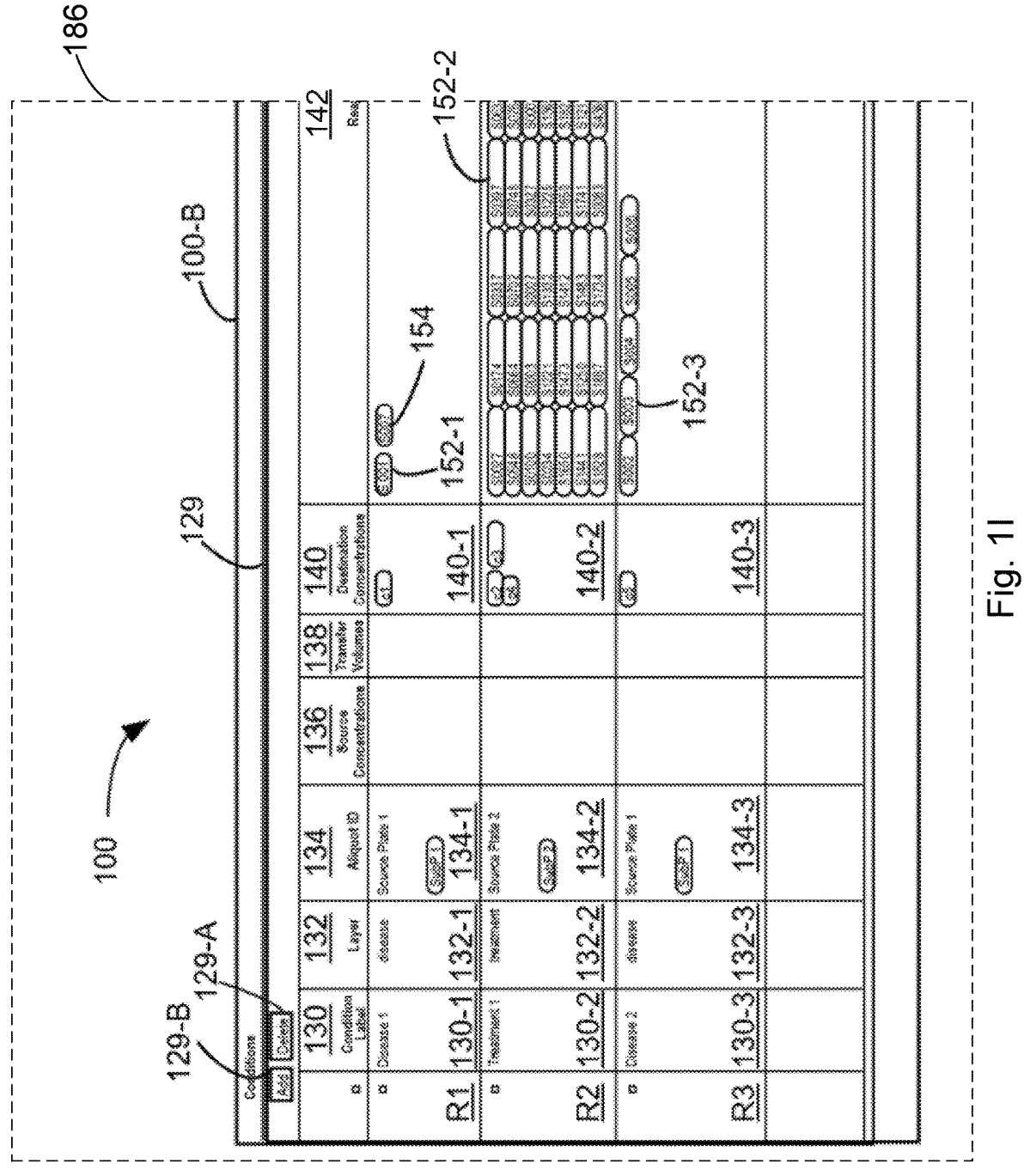
FIG. 1I is a portion of the second section of the user interface of FIG. 1H enlarged for magnification purposes.
Figure 1J:
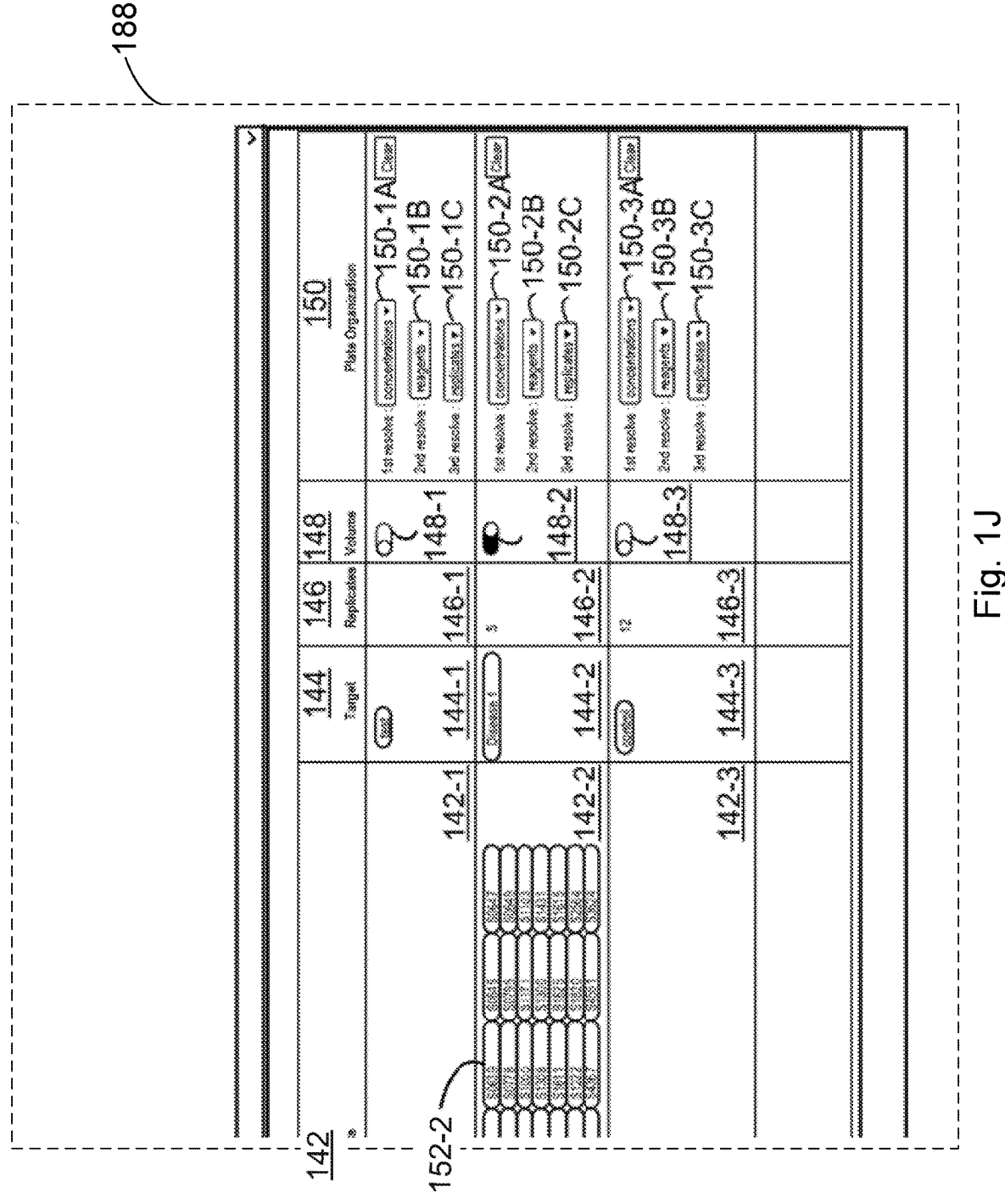
FIG. 1J is a portion of the second section of the user interface of FIG. 1H enlarged for magnification purposes.
Figure 1K:
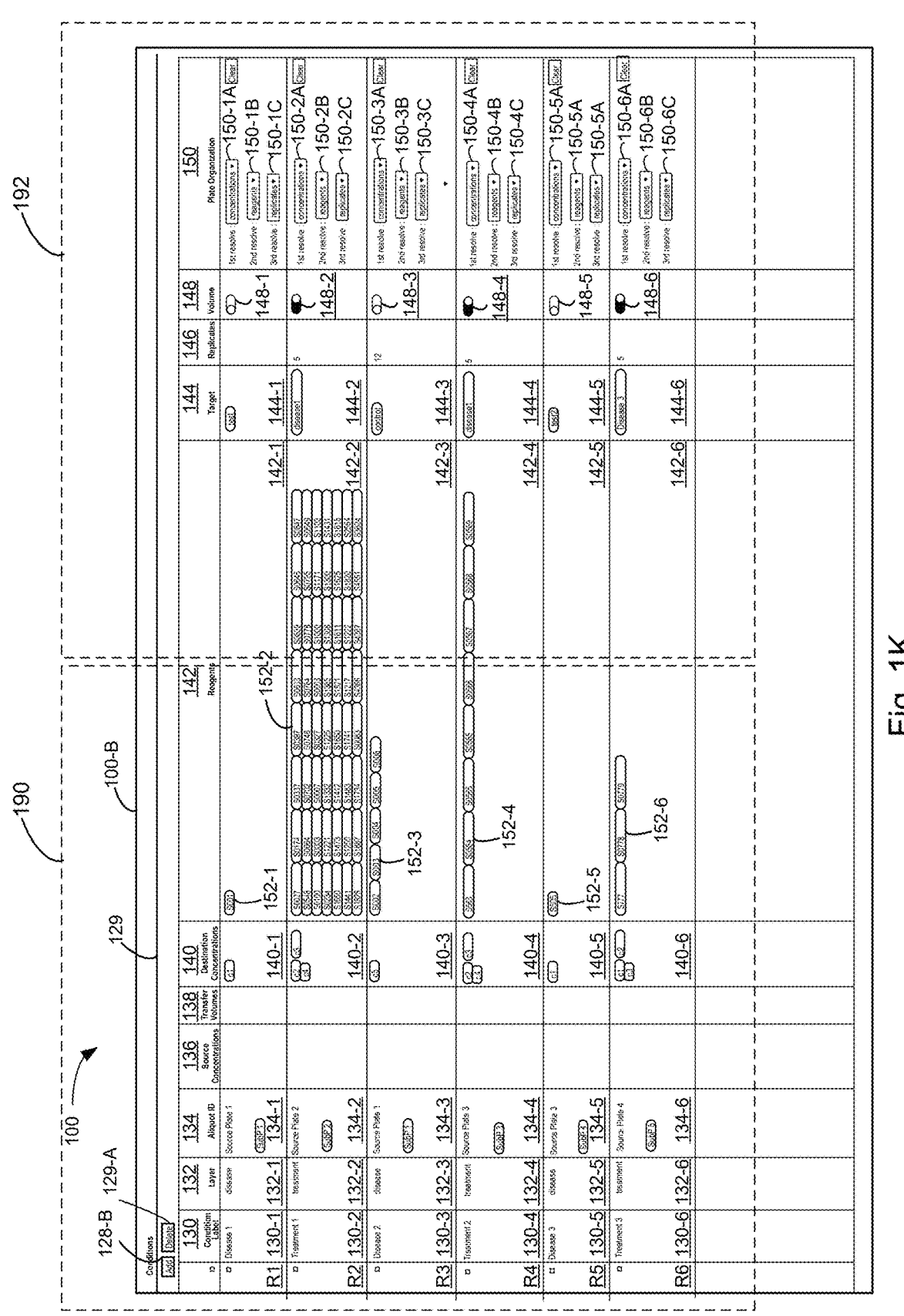
FIG. 1K is an exemplary illustration of a third section of a user interface for designing cell-based screening assay experiments in accordance with some embodiments.
Figure 1L:
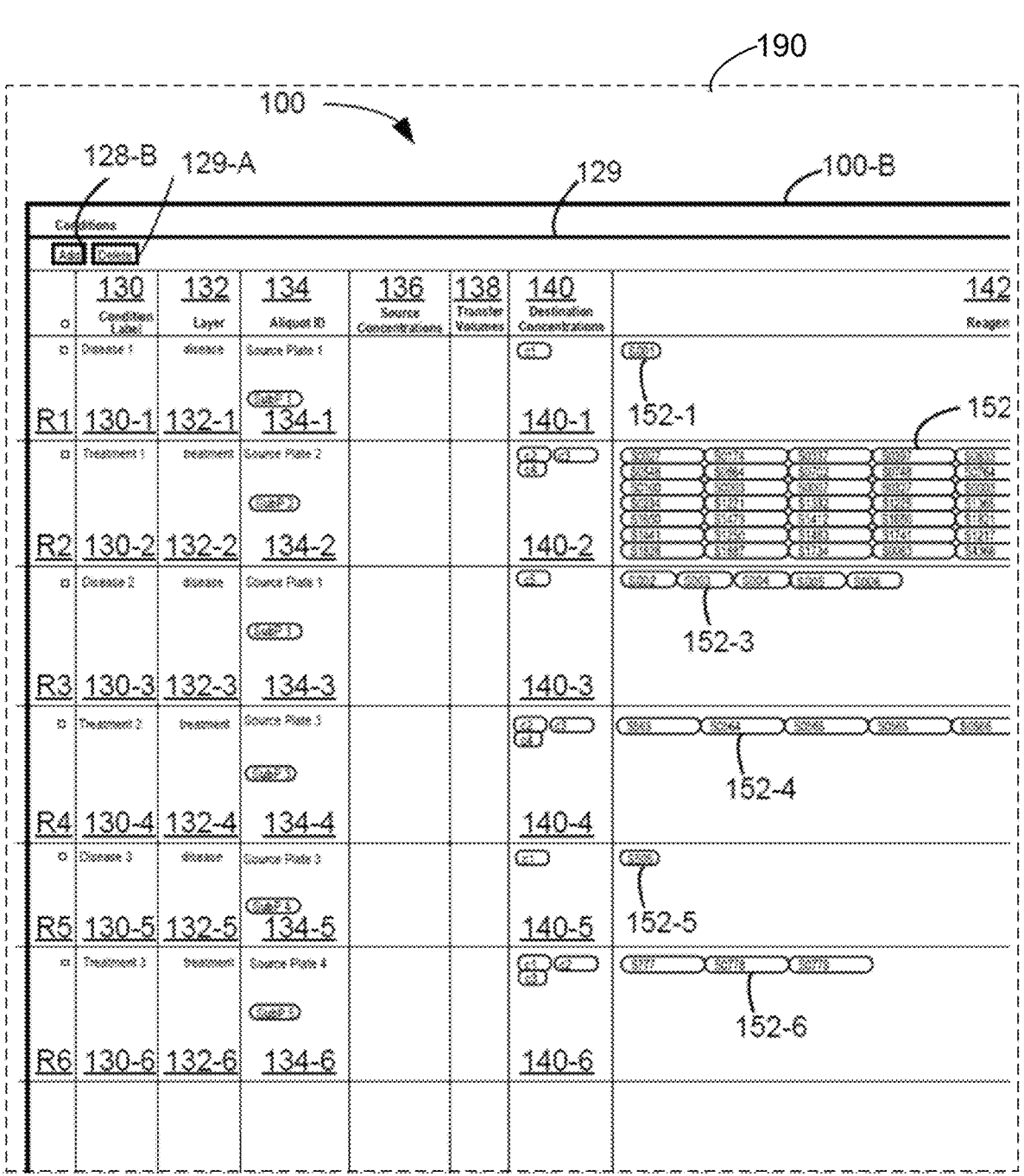
FIG. 1L is a portion of the third section of the user interface of FIG. 1K enlarged for magnification purposes.
Figure 1M:
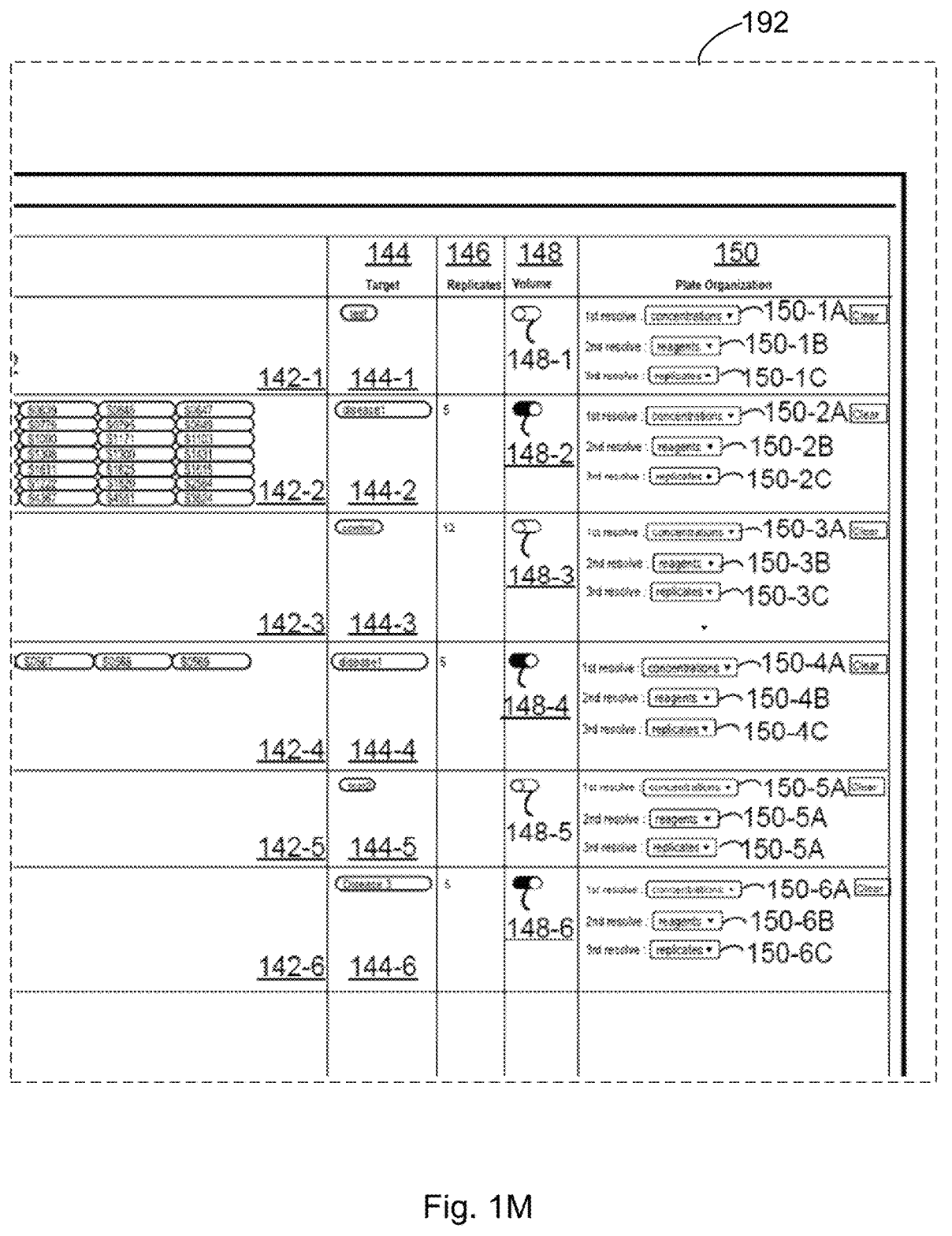
Figure 1N:
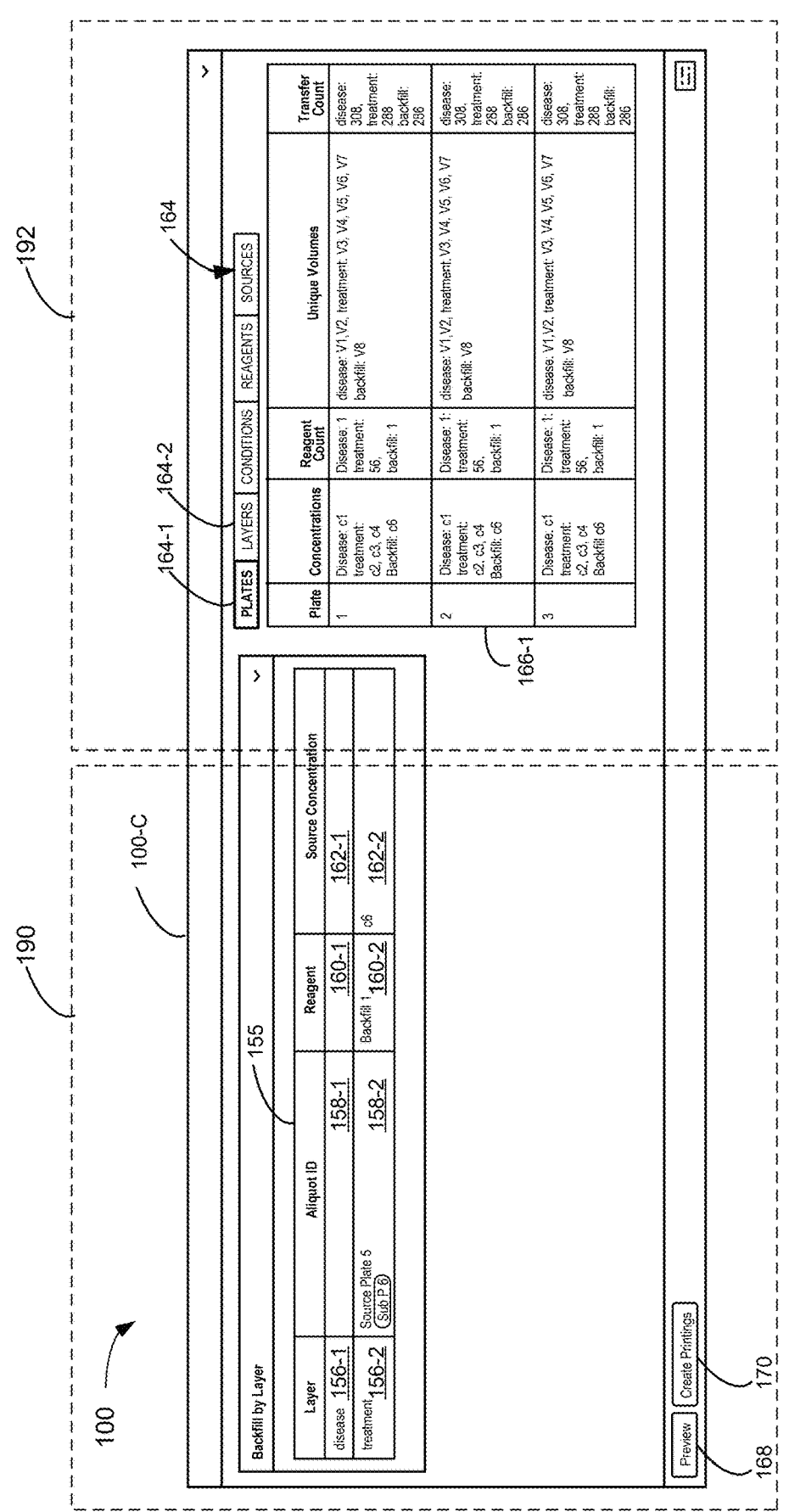
FIG. 1N is another exemplary illustration of a third section of a user interface for designing cell-based screening assay experiments in accordance with some embodiments.
Figure 1O:
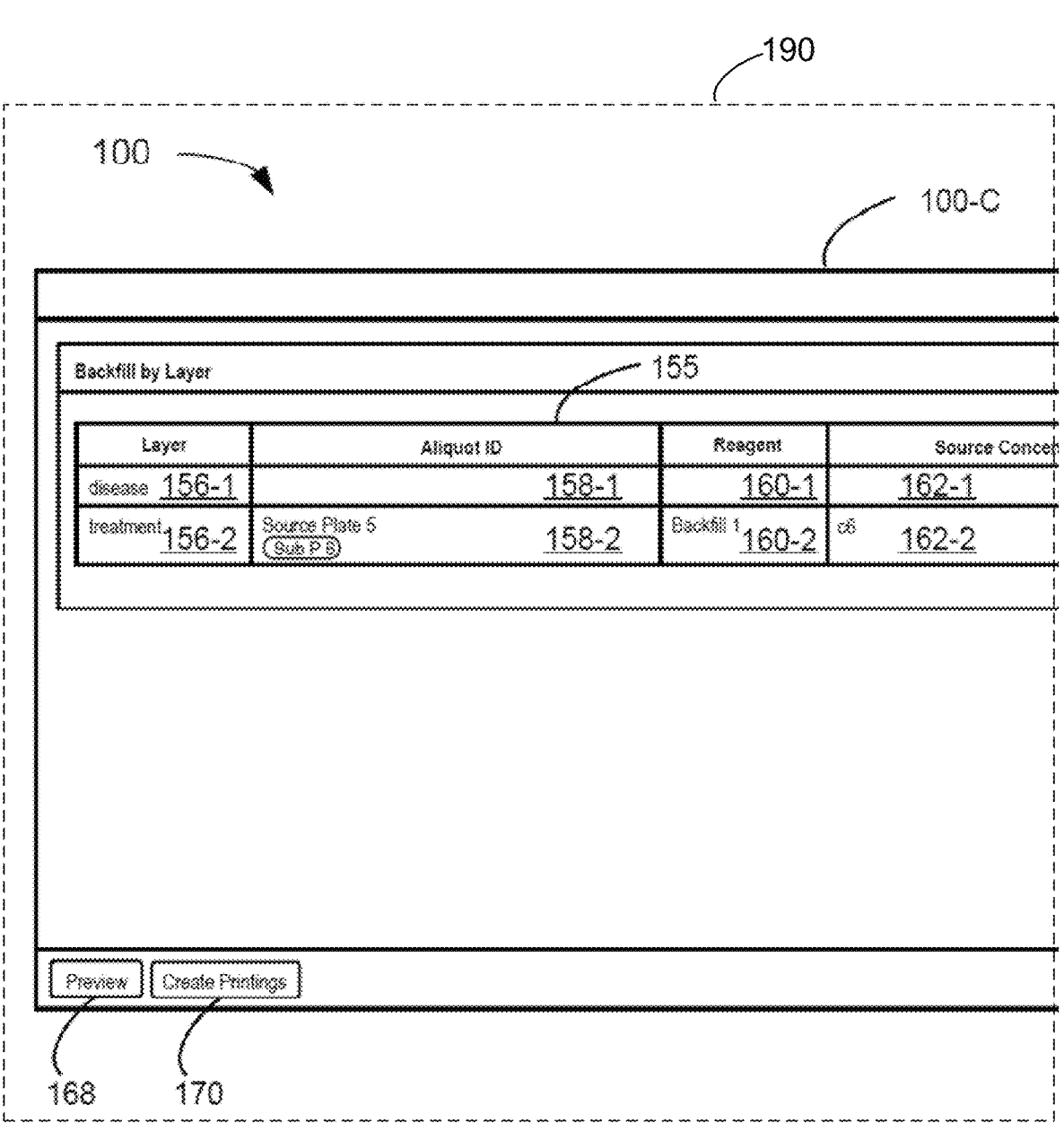
FIG. 1O is a portion of the third section of the user interface of FIG. 1N enlarged for magnification purposes.
Figure 1P:
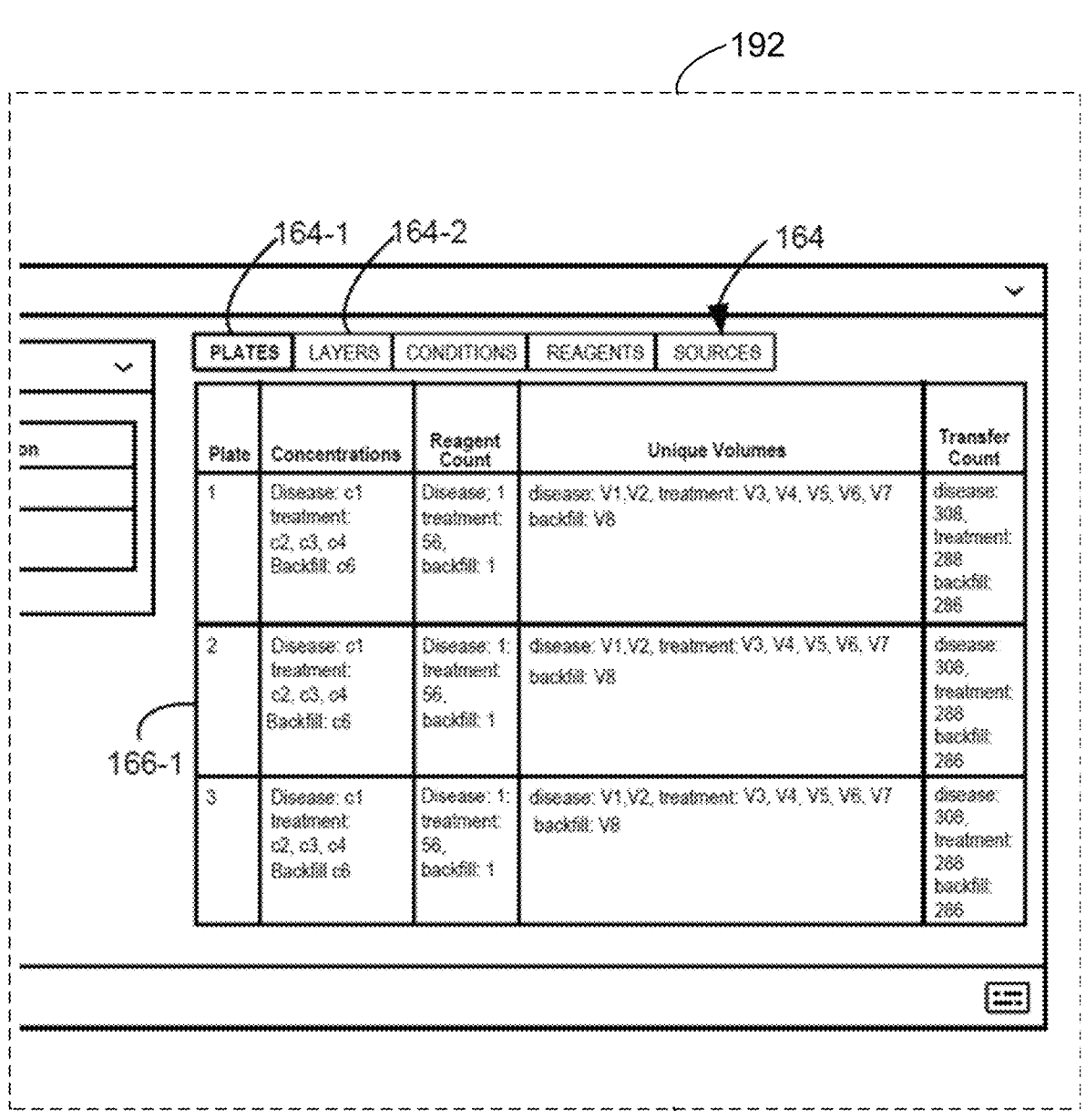
FIG. 1P is a portion of the third section of the user interface of FIG. 1N enlarged for magnification purposes.
Figure 1Q:
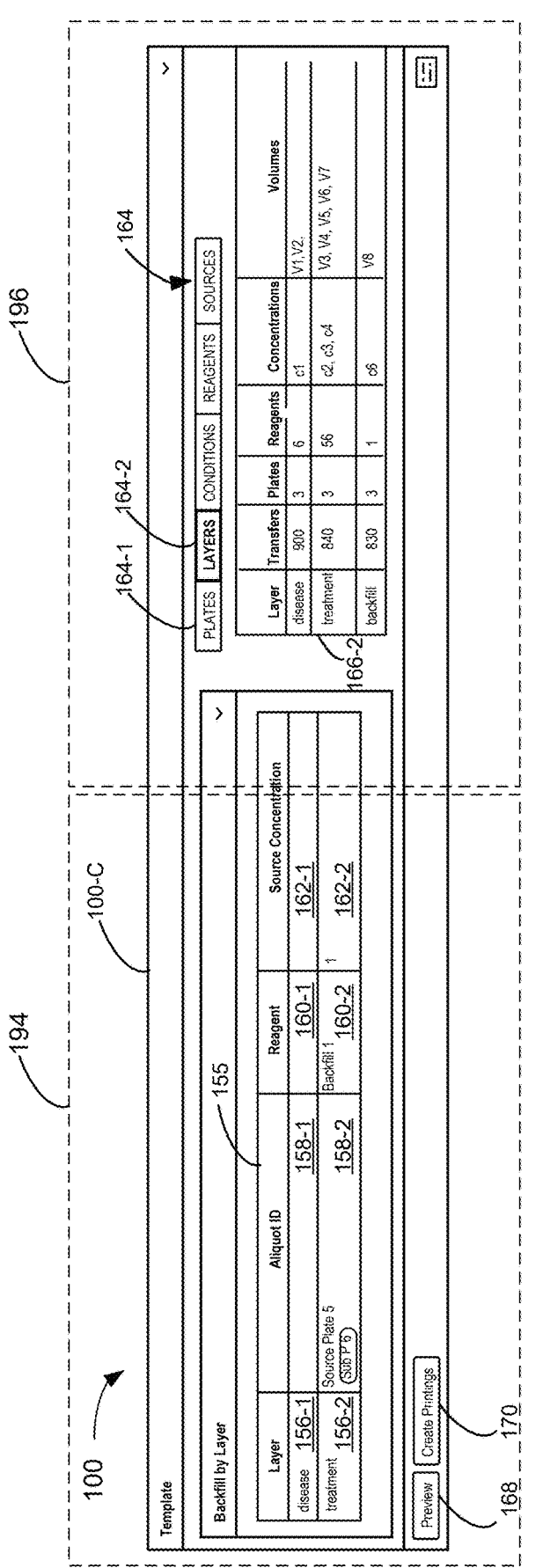
FIG. 1Q is another exemplary illustration of a third section of a user interface for designing cell-based screening assay experiments in accordance with some embodiments.
Figure 1R:
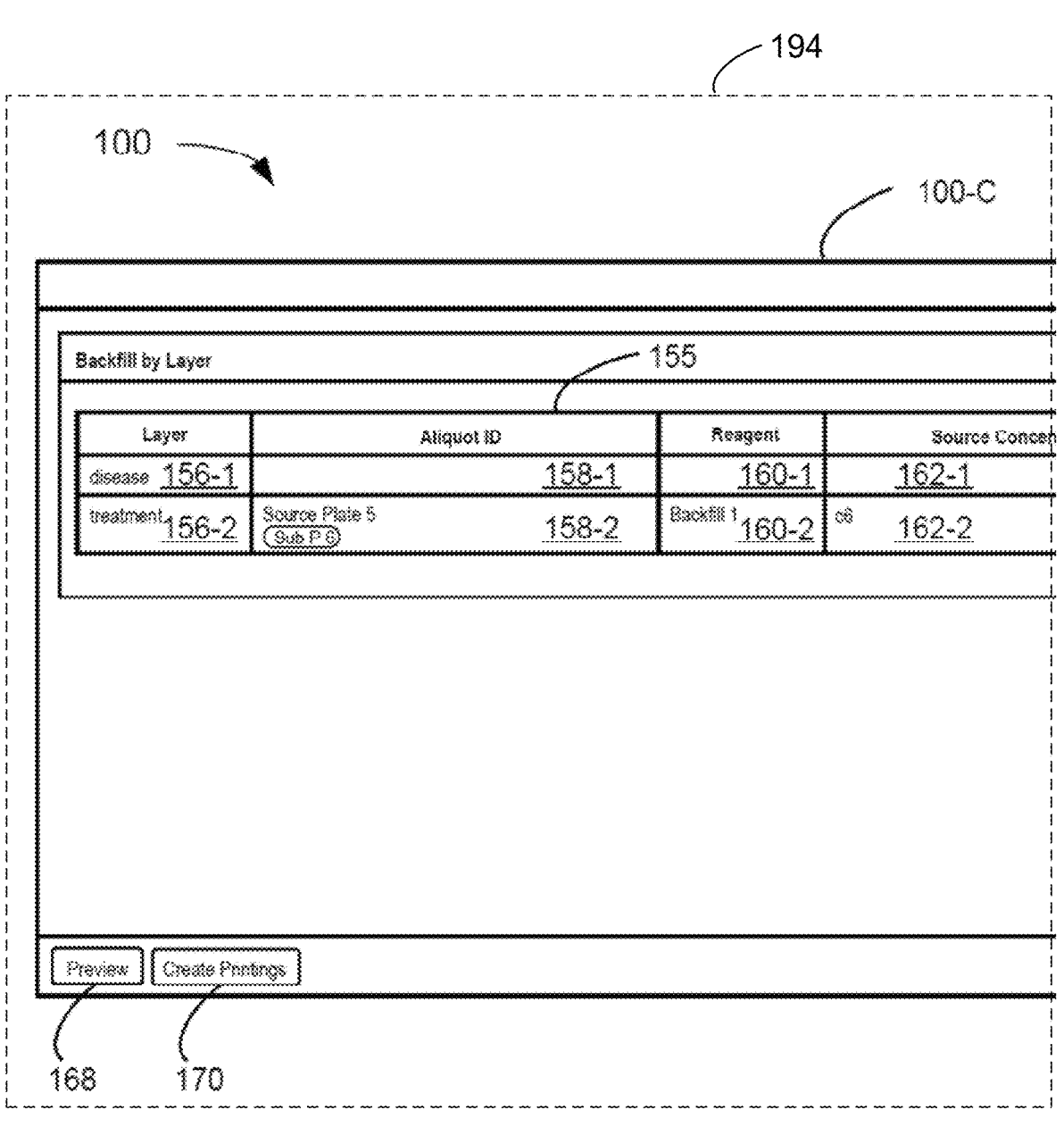
FIG. 1R is a portion of the third section of the user interface of FIG. 1Q enlarged for magnification purposes.
Figure 1S:
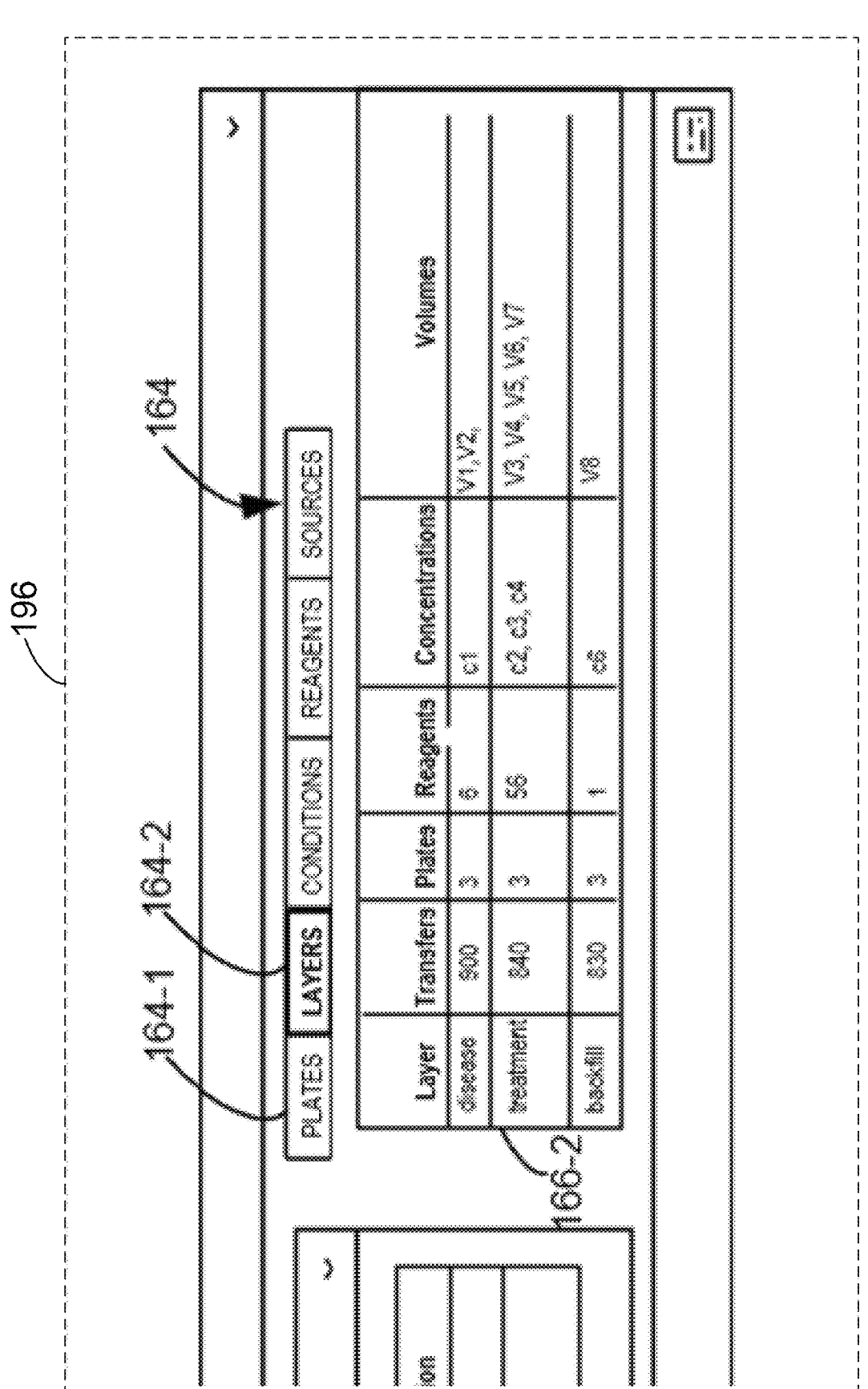
FIG. 1S is a portion of the third section of the user interface of FIG. 1Q enlarged for magnification purposes.
Figure 1T:
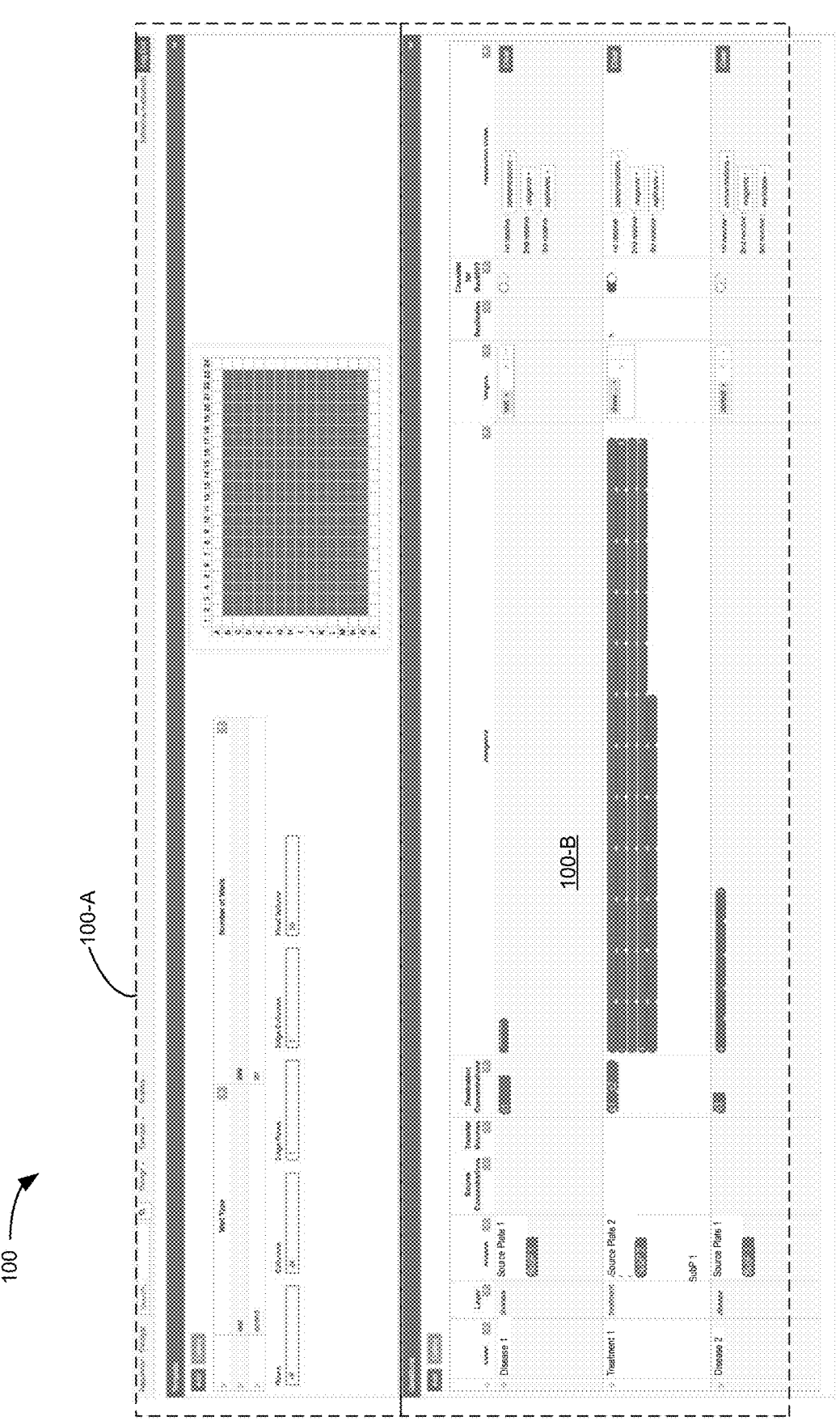
FIG. 1T is an exemplary illustration of a first and second section of a user interface for designing cell-based screening assay experiments in accordance with some embodiments.

FIGS. 1A-1T provide exemplary illustrations of user interface 100 for designing cell-based screening assay experiments. User interface 100 is displayed and operated by a system (e.g., a computer system described below with respect to FIG. 5). User interface 100 provides a visual platform for providing and manipulating input metadata defining an experiment. The system then processes the input metadata and generates combinatorial experiment metadata for a cell-based screening assay.

FIGS. 1A-1D and 1T are exemplary illustrations of first section 100-A of user interface 100 for designing cell-based screening assay experiments in accordance with some embodiments. Section 100-A includes one or more affordances and input elements for entering parameters for defining a template plate for a cell-based screening assay experiment. A template plate includes a plurality of wells that are assigned, for example, as test wells (e.g., wells including one or more test reagents, such as disease reagents and one or more treatment reagents), control wells (e.g., wells including one or more disease reagents and optionally one or more control reagents), or as empty wells. The test reagents are any reagents that are included in a study. In a typical instance, a test well includes one or more disease reagents and one or more treatment reagents. In another instance, a test well includes one or more of any other reagents included in a study (e.g., a reagent including healthy cells). It is understood that the terms "disease reagent" and "treatment reagent" are used herein as exemplary and could be replaced with any terms describing any test reagents involved in a study. In some embodiments, wells in a number of rows and columns at an edge of a template plate are assigned as empty wells, because such location on a test well provides less reliable measurement results in image-based screening. A size of the template plate is defined by input elements 112-1 and 112-2 for identifying a number of rows and columns in a template plate, respectively. In some embodiments, the template plate is a standard 96-well, 384-well, 1536-well, or 3456-well plate. For example, a 384-well plate is defined by 16 rows (e.g., input element 112-1) and 24 columns (e.g., input element 112-2). A number of edge rows and columns (i.e., peripheral rows and columns) that are left empty in the template plate are defined in input elements 114-1 'Edge Rows' and 114-2 'Edge Columns,' respectively. For example, a number of edge rows and/or edge columns is 0, 1, 2, 3, or 4. Final volume (e.g., in microliters) of each well of the template plate is defined in input element 116. For example, in FIG. 1A, a final volume of each well in the template plate is defined to be 50 microliters. The final volume cannot exceed a maximum volume defined for screening plates by its manufacturer. In some embodiments, input elements 112-1, 112-2, 114-1, 114-2 and 116 include default values that a user can adjust, as desired.

Section 100-A of interface 100 also includes table 102 for defining one or more sets of template test wells and/or one or more sets of template control wells. Each row (e.g., rows 110-1 and 110-2) in table 102 corresponds to a set of template test wells or template control wells. Rows are added and/or removed by user inputs to affordances 118-1 and 118-2, respectively. Table 102 also includes respective well types (e.g., column 106) and respective numbers of wells (e.g., column 108) for each set of template test wells or template control wells. Row 110-1 in table 102 defines a first set of template wells having a well type defined in input element 106-1 and number of template wells defined in input element 108-1. For example, input element 106-1 is labeled as 'test' corresponding a test well and input element 108-1 indicates that the first set of template wells includes 288 template wells. Row 110-2 in table 102 defines a second set of template wells having a well type defined in input element 106-2 and a number of template wells in input element 108-2. For example, input element 106-2 is labeled as 'control' corresponding a control well and input element 108-2 indicates that the second set of template wells includes 20 template wells. A total number of wells in column 108, corresponding to a sum of numbers of wells identified in the input elements of column 108, cannot exceed a total number of template wells available on the template plate. The total number of template wells available is defined by number of rows and number of columns in input elements 112-1 and 112-2, respectively, (e.g., 384 wells) and number of empty wells defined in input elements 114-1 and 114-2, respectively. Table 102 in FIG. 1A defines one set of template test wells (e.g., row 110-1) and one set of template control wells (e.g., row 110-2), but by increasing a number of rows in table 102, the number of template test wells and/or number of template control wells is increased easily.

Section 100-A also includes template plate preview 104-1 that provides a visual illustration of the template plate defined in table 102 and in input elements 112-1, 112-2, 114-1, 114-2 and 116. Each well in template plate preview 104-1 is represented by a graphical object (e.g., each graphical object in template plate preview 104-1 correspond to control template well 122, empty well 124, or test template well 126). Each well in the template well is identified by unique coordinates defined by a column identification 120-1 (e.g., 1, 2, 3, 4, etc.) and a row identification 120-2 (e.g., A, B, C, D, etc.). Each well in the template plate is assigned to be an empty well (e.g., as defined by edge rows and columns defined in input elements 114-1 and 114-2) or a well associated any of the sets of wells defined in table 102 (e.g., corresponding to rows 110-1 or 110-2). In FIG. 1A, template plate preview 104-1 includes empty wells 124, test template wells 126 associated with row 110-1 labeled as 'test' and control template wells 122 associated with row 110-2 labeled as 'control'. Each well type is characterized with a graphical feature so that the graphical objects corresponding to a respective well type types is visually recognizable. In some embodiments, each well type is characterized by a specific color, a pattern, or a text object (e.g., a letter, a number or a character). In some embodiments, empty wells 124 are blank while test template wells 126 and control template wells 122 are each represented with a specific color or a pattern.

FIG. 1C is another exemplary illustration of section 100-A of user interface 100. In FIG. 1C, table 102 includes yet another row 110-3 defining a third set of template wells in the template plate having well type defined in input element 106-3 and a number of wells defined in input element 108-3. The well type in input element 106-3 is labeled as 'test2' corresponding to a test well and input element 108-3 indicates that the third set of template wells includes 144 wells. It is noted that each well type in column 106 should be uniquely labeled so that a respective set of template wells may be referred to with the unique label. For example, table 102 includes two sets of test template wells, row 110-1 referred to as 'test' and row 110-3 referred to as 'test2.' Since the total number of wells defined in column 108 cannot exceed the total number of available test wells on the template plate, in FIG. 1C the first set of wells on row 110-1 includes 144 wells, as defined by number of wells in input element 108-1. Template plate preview 104-2 reflects the addition of the third set of wells defined in table 102. Template preview 104-2 includes graphical objects corresponding to test template wells 128 associated with row 110-3, in addition to control template wells 122, test template wells 126 and empty wells 124. Test template wells 128 are again characterized with a unique graphical feature such as a color or a pattern, distinct from graphical features of control template wells 122, test template wells 126 and empty wells 124.

FIGS. 1D-1J are exemplary illustrations of second section 100-B of user interface 100 for designing cell-based screening assay experiments in accordance with some embodiments. Section 100-B includes table 129 for defining conditions for a high-throughput screening assay experiment. Each row in table 129 (e.g., rows R1, R2, and R3) defines a distinct condition that shares certain properties such as replicates, concentrations, and a source plate. Each condition is associated with a layer that defines a functionality of condition. In general, a test well includes at least one disease layer, at least one treatment layer, and a backfill layer. Optionally, a test well includes an unknown layer. Rows are added and/or removed by affordances 129-A and 129-B, respectively. Table 129 includes a number of columns (e.g., columns 130-150) for defining parameters for each condition. Column 130 includes input elements 130-1, 130-2, and 130-3 for entering a label (i.e., a name) for each layer. Column 132 includes input elements (e.g., input elements 132-1, 132-2, and 132-3) for defining a layer type, e.g., the layer type is selected from a disease layer, a treatment layer, or an unknown layer. In FIG. 1D, rows R1 and R3 are defined as disease layers, and row R2 is defined as a treatment layer. Column 134 includes input elements (e.g., input elements 134-1, 134-2, and 134-3) for entering a source plate for each respective layer. Input element 134-1 defines a source plate (i.e., 'Aliquot ID') including a plurality of wells with a target disease compound. In some embodiments, input elements 134-1, 134-2, and 134-3 each include a drop-down menu that allows a user to select the desired source plate from a plurality of source plates. In some embodiments, the drop-down menu is linked to an inventory database including all available source plates in the inventory. In some embodiments, input elements 134-1, 134-2, and 134-3 each also include a drop-down menu for selecting a sub-category under the source plate. For example, input elements 134-1 and 134-3 of respective rows R1 and R3 illustrate a selection of a source plate labeled as 'Source Plate 1 with a sub-category labeled as 'SubP 1,' and input element 134-2 of row R2 illustrates a selection of a source plate labeled as 'Source Plate 2' with sub-category 'SubP 2.' In some embodiments, input elements 134-1, 134-2, and 134-3 include identifiers 135-1, 135-2, and 135-3, respectively. Identifiers 135-1, 135-2, and 135-3 uniquely reference corresponding source plates of sub-categories under the source plates, that include reagents defined in respective input elements 142-1, 142-2, and 142-3. Column 140 includes input elements (e.g., input elements 140-1, 140-2, and 140-3) for defining one or more destination concentrations to be tested for each respective layer. For example, disease layers of rows R1 and R3 each include one concentration 'c1' and treatment layer of row R2 includes three concentrations 'c2,' 'c3,' and 'c4.' As used herein, a destination concentration refers to a concentration of an ingredient (e.g., a disease or a treatment reagent) in the final volume of a well. The final volume defined by the template plate (e.g., as defined in input element 116 described above with respect to FIG. 1A). In some embodiments, a user defines, alternative to destination concentrations in column 140, respective source concentrations in column 136 (e.g., input elements 136-1, 136-2, and 136-3) and respective transfer volumes in column 138 (e.g., input elements 138-1, 138-2, and 138-3). In such embodiments, the destination concentration for each input element in column 140 is determined based on a respective source concentration defined in column 136 and a respective transfer volume defined in column 138.

Column 142 of table 129 includes input elements (e.g., input elements 142-1, 142-2, and 142-3) for defining sets of reagents. Each set includes one or more reagents. Input element 142-1 includes a disease reagent selected from the source plate identified in input element 134-1, input element 142-2 includes treatment reagents selected from the source plate identified in input element 134-2 and input element 142-3 includes disease reagents selected from the source plate identified in input element 134-3. It is desirable to design a HTS assay experiment so that the sets of reagents, such as those in input elements 142-1, 142-2, and 142-3, are each physically located on a respective source plate, because such design reduces time required for transferring the sets of reagents from source plates to test plates. For example, the treatment reagents in input element 142-2 are all physically located on the source plate defined in input element 134-2. In some embodiments, input elements 142-1, 142-2, and 142-3 include identifiers (e.g., identifiers 152-1, 152-2, and 152-3) that reference a source plate data element corresponding the source plates referenced in the corresponding input elements in column 134. In some embodiments, a source plate data element identifies a source concentration of a respective reagent on the source plate identified in a respective input element in column 143 and, optionally, a physical location of the respective reagent on the corresponding reagent source plate. For example, the physical location of the respective reagents on the source plate is identified by coordinates including a column and row coordinate. In some embodiments, identifiers 152-1, 152-2, and 152-3 include a link to identify a respective reagent in an inventory database. For example, identifier 152-1 includes identifier 152-1 labeled as 'S001' referencing a particular data element associated with the disease reagent source plate identified in input element 134-1 (e.g., 'Source Plate 1,' sub-category 'SubP 1'). In some embodiments, the data element further identifies a source concentration and a physical location of the respective disease reagent on the disease reagent source plate.

Column 144 of table 129 includes input elements (e.g., input elements 144-1, 144-2, and 144-3) for selecting a target for the conditions identified in rows in table 129 (e.g., rows R1, R2, and R3) to form a combinatorial experiment. The target indicates how the test reagents of different conditions of table 129 will be physically combined during an experiment. By selecting a target in column 144, each row of table 129 is associated either with sets of wells identified in table 102 of section 100-A described above with respect to FIG. 1A, or with other layers of table 129. The association occurs by entering a respective label selected from column 106 of table 102 in FIG. 1A (e.g., input elements 106-1 and 106-2) or from column 132 of table 129 (e.g., input elements 132-1, 132-2, 132-3). In FIG. 1E, input element 144-1 includes a selection 'test,' that associates the condition of row R1 (a disease layer) with the first set of wells identified on row 110-1 of table 102 in FIG. 1A, indicating that the disease reagent layer identified on row R1 will be physically placed to test template wells 126 in the template plate. Input element 144-2 includes a selection 'disease 1,' that associates the condition of row R2 (a treatment layer) with row R1 (a disease layer), indicating that the treatment layer identified on row R2 will be physically placed to the same wells as the disease layer of row R1 (i.e., test template wells 126). Input element 144-3 includes a selection 'control' that associates the condition of row R3 (a disease layer) with the second set of wells identified on row 110-2 of table 102 in FIG. 1A, indicating that the disease reagent layer identified on row R3 is physically placed to control template wells 122 in the template plate. Thus, column 144 offers a flexible and efficient feature for combining sets of disease reagents, treatment reagents, and/or control reagents by a simple selection feature in column 144 to form an experiment.

Column 146 of table 129 includes input elements (e.g., 1461, 146-2, and 146-3) for identifying a number of replicates for respective layers of rows R1, R2, and R3. For example, input element 146-2 includes number '5' defining that the designed experiment should include five replicates for reach reagents (e.g., the 56 reagents identified in input element 142-2) with each destination concentration identified in input element 140-2 (e.g., destination concentrations of 'c1,' 'c2,' and 'c3'). For example, condition of row R2 includes five replicates (e.g., input element 146-2) of the 56 reagents (e.g., input element 142-2) with three concentrations (e.g., input element 140-2), corresponding to 840 test wells required for the experiment.

Column 148 of table 129 includes affordances (e.g., affordances 148-1, 148-2 and 148-3) identifying whether a respective row is considered to be a volume contributor. For example, in column 148 in FIG. 1D affordance 148-2 are selected to define that layer of row R2 is a volume contributor and affordances 148-1 and 148-2 are selected to define that rows R1 and R3 are not volume contributors. A volume contributor refers to a reagent that is calculated toward the final volume (e.g., final volume defined in input element 116 in FIG. 1A) and is therefore considered when a volume of a backfill required to top up the final volume is determined. The backfill will be discussed further in detail below with respect to FIG. 1K.

Column 150 of table 129 includes input affordances (e.g., affordances 150-1A, 150-1B, 150-1C, 150-2A, 150-2B, 150-2C, 150-3A, 150-3B, and 150-3C) defining an order for arranging (e.g., resolving) each layer of the layers defined in table 129 (e.g., each layer of layers defined on rows R1, R2, and R3) on a plurality of test plates that are instances of the template plate defined in section 100-A in FIG. 1A. The first resolve parameter (e.g., affordance 150-2A) takes precedence over the second resolve parameter (e.g., affordance 150-2B), and the second resolve parameter takes precedence over the third resolve parameter (e.g., affordance 150-2C). Thereby, the test wells are arranged by firstly iterating through all the reagents with a first resolve parameter, secondly iterating through all the reagents with a second resolve parameter, and thirdly iterating through all the reagents with a third resolve parameter. The resolve parameters include concentration (e.g., respective destination concentrations defined in column 140), reagents (e.g., respective set of reagents defined in column 142), and replicates (e.g., respective number of replicates defined in column 146. For example, the test wells including combinations of the condition of row R1 and the condition of row R2 are arranged by firstly iterating through each of the treatment reagents of row R2 (e.g., input element 142-2) with a first concentration (e.g., concentration 'c2' defined in input element 140-2), secondly iterating through each of the treatment reagents with a second concentration (e.g., concentration 'c3' defined in input element 140-2), and thirdly iterating through each of the 56 treatment reagents with a third concentration (e.g., concentration 'c4' defined in input element 140-2). Finally, each unique combination of the disease reagents with a particular concentration of a particular treatment reagents is replicated five times.

As described above, table 129 of FIG. 1D provides a visual platform for entering and manipulating input metadata for designing a cell-based HTS assay experiment. In particular, the interface of the present disclosure allows a user to separately enter and manipulate experiment metadata defining what goes into test wells (e.g., columns 130, 132, 134, 140, 142 and 144 in table 129), and how the test wells are distributed over the test plates (e.g., column 150 in table 129). The separation enables a convenient and fast definition and manipulation of the input metadata. The input metadata provided in table 129 by the user is automatically processed to create an experiment including combinations of the conditions defined in table 129 (e.g., the conditions of rows R1, R2, and R3).

FIG. 1D further includes alert element 151. In some embodiments, the system determines whether a destination concentration provided in input element 140-1 or in input element 140-2 for a respective reagent of disease reagents defined in input element 142-1 or input element 142-2 meets concentration criteria. Concentration criteria refer to criteria defining a range of destination concentrations that can be prepared for a particular reagent from a particular source plate that the particular reagent is associated with. The concentration criteria take into consideration the source concentration of the particular reagent on its source plate (e.g., source plates defined in column 143) and the final volume of test well (e.g., as defined in input element 116 in FIG. 1A). In accordance with a determination that a destination concentration provided in input element 140-1 or input element 140-2 does not meet respective concentration criteria, the system provides an alert message (e.g., alert element 151). For example, the alert message is a pop-up item including a text indicating a cause of providing the alert.

To summarize the experiment designed by user inputs in table 129, the experiment includes a disease condition (e.g., row R1) and a treatment condition (e.g., row R1). The disease condition includes one disease reagent, identified in input element 142-1, which is tested against 56 treatment reagents defined in input element 142-2 of row R2 with three different concentrations defined in input element 140-2. The disease layer and the treatment layer are associated (e.g., will be physically transferred to) test template wells 126 of the template plate defined by row 110-1 in FIG. 1A. The experiment includes five replicates (e.g., defined in input element 146-2) for each combination of the disease reagent with each of the treatment reagents. Therefore, the total number of test wells required to perform the designed screening assay experiment is 840 test wells (i.e., 56 reagents×3 concentrations×5 replicates). The 840 test wells are distributed over three test plates that are instance of the template plate defined by user input described above with respect to FIG. 1A. The 840 test wells are arranged in an order defined in column 150 so that first resolve parameter is concentration (e.g., affordance 150-2A), the second resolve parameter is reagents (e.g., affordance 150-2B), and the third resolve parameter is replicates (e.g., affordance 150-2C). The order corresponds to firstly iterating through each of the 56 treatment reagents with a first concentration (e.g., concentration 'c2' defined in input element 140-2), secondly iterating through each of the 56 treatment reagents with a second concentration (e.g., concentration 'c3' defined in input element 140-2), and thirdly iterating through each of the 56 treatment reagents with a third concentration (e.g., concentration 'c4' defined in input element 140-2). Finally, each unique combination of the disease reagents with a particular concentration of a particular treatment reagents is replicated five times. By defining the replicates as the third parameter, the replicates will be distributed on the test plates as far away from each other as possible. Such arrangement of the test wells may be desirable for providing a statistically valid result, because the replicates are thereby distributed over all the test plates (e.g., in contrast to testing all 5 replicates of a treatment reagent in one test plate). Such arrangement may be preferred because it minimizes the effect of fluctuations in measurement conditions occurring over time. The resolve order may optionally be chosen for minimizing time required for performing the experiment. For example, the resolve parameters are chosen to minimize time required for transferring the reagents from source plates to the test plates. The design further defines that the experiment includes a control condition on row R3 which is associated, in input element 144-3, with 'control' template wells defined in row 110-2 in FIG. 1A. The control wells include five disease reagents defined in input element 142-3 having one destination concentration in input element 140-3.

FIG. 1H is another exemplary illustration of second section 100-B of user interface 100. Section 100-B of FIG. 1H corresponds to section 100-B described above with respect to FIG. 1D, except that in FIG. 1H input element 142-1 includes additional identifier 154, labeled as 'S007.' Identifier 154 corresponds to identifier 152-1 that references another source plate data element corresponding the source plate referenced in the corresponding input elements 134-1. FIG. 1H illustrates how the user interface of the present disclosure provides an efficient and easy method for manipulating a complex experiment design for a screening assay. For example, after initial setting up of the experiment described with respect to FIG. 1D, a scope of the experiment is broadened by adding a second reagent (e.g., a reagent associated with identifier 154) to disease row R1, without a need of adjusting other parameters in table 129. For example, where the designed experiment illustrated in FIG. 1E required 840 test wells, the designed experiment in FIG. 1H will require twice as many test wells.

FIG. 1K is yet another exemplary illustration of second section 100-B of user interface 100. Section 100-B of FIG. 1K corresponds to section 100-B described above with respect to FIG. 1D, except that table 129 further includes rows R4, R5, and R6. Row R4 includes treatment condition (e.g., input element 132-4 includes a selection for 'treatment') labeled as 'Treatment 2' in input element 130-4. Row R4 further identifies a source plate labeled as 'Source Plate 3' with sub-category labeled as 'SubP 3' in input element 134-4, a set of identifiers 152-4 in input element 142-4 and a destination concentration in input element 140-4. Row R4 is associated with layer 'Disease 1' in input element 144-4, indicating that the treatment reagents identified in row R4 will be physically located in the same test wells as the disease reagents of row R1 and treatment reagents of row R2. Affordance 148-4 indicates that the treatment reagents of row R4 are volume contributors and affordances 150-4A, 150-4B and 150-4C indicate the order of resolving the layer defined in row R4. Row R5 includes a disease condition (e.g., input element 132-5 includes a selection for 'disease') labeled as 'Disease 2' in input element 130-5. Row R5 further identifies a source plate labeled as 'Source Plate 3' with sub-category labeled as 'SubP 4' in input element 134-5, a set of identifiers 152-5 in input element 142-5 and a destination concentration in input element 140-5. Row R5 is associated with layer 'test2' in input element 144-4, indicating that the treatment reagents identified in row R4 will be physically in test template wells 128 of well type 106-3, as described above with respect to FIG. 1C. Affordance 148-5 indicates that the treatment reagents of row R5 are not volume contributors and affordances 150-5A, 150-5B and 150-5C indicate the order of resolving the layer defined in row R5. Row R6 includes a treatment condition (e.g., input element 132-6 includes a selection for 'treatment') labeled as 'Treatment 3' in input element 130-6. Row R6 further identifies a source plate labeled as 'Source Plate 4' with sub-category labeled as 'SubP 5' in input element 134-6, a set of identifiers 152-6 in input element 142-6 and a destination concentration in input element 140-6. Row R6 is associated with layer 'disease 3' in input element 144-6, indicating that the treatment reagents identified in row R6 will be physically located in the same test wells as the disease reagents of row R5. Affordance 148-6 indicates that the treatment reagents of row R6 are volume contributors and affordances 150-6A, 150-6B and 150-6C indicate the order of resolving the layer defined in row R6.

FIGS. 1N-1S are exemplary illustrations of third section 100-C of user interface 100 for designing cell-based screening assay experiments in accordance with some embodiments. Section 100-C includes table 155 for defining backfill solutions for the disease reagents and treatment reagents defined in section 100-B. A backfill solution is an inert solution that is used to fill up each test well up to the final volume defined by input element 116 in FIG. 1A. For example, the backfill solution in table 155 is labeled as 'Backfill 1.' The transfer volume of the backfill solution for each test well is determined based on a deficit for each test well. A deficit is determined based on transfer volumes of respective one or more disease reagents and one or more treatment reagents added to each test well. Input elements 156-1 and 156-2 identify a particular layer to associate a respective backfill solution with in accordance the layer defined in column 132 of FIG. 1H (e.g., 'disease' or 'treatment'). Input elements 158-1 and 158-2 define a source plate (i.e., 'Aliquot ID') including a plurality of wells with a backfill solution. In some embodiments, all wells of the backfill source plate include a same solution with a same concentration. In some embodiments, input elements 160-1 and 160-2 include a name associated with the backfill solution (e.g., 'Backfill 1') and input elements 162-1 and 162-2 include (source) concentration of the backfill solution, e.g., concentration 'c6.'

Based on the input provided by a user in sections 100-A, 100-B and 100-C of user interface 100, the system (e.g., system described below with respect to FIG. 5) automatically generates a design for the cell-based screening assay. The system determines a number of template test wells, as defined in section 100-A, required for performing the cell-based screening assay experiment. The automatically generating also includes distributing the test wells required for performing the cell-based screening assay over the test plates. The system also determines a number of control test wells, as defined in section 100-B, required for performing the cell-based screening assay, and distributing the control wells required for performing the cell-based screening assay over the test plates. The distribution includes arranging the test wells over the test plates in accordance with the resolve order defined by column 150 in Section 100-B. Experiment metadata related to the designed cell-based screening assay experiment is saved to a database (e.g., in memory 590 or non-volatile memory 592 of system 500 described below with respect to FIG. 5). The data is retrievable from the database for later use. In accordance with automatically generating the design for the cell-based screening assay, the system creates a set of liquid transfer instructions that are configured to be used to perform the designed experiment by commercially available devices and/or systems for performing high throughput screening assay experiments. In some embodiments, the liquid transfer instructions are provided in a plain text format, such as comma separated values (csv). An example of liquid transfer instructions is provided in FIG. 3 below.

Section 100-C includes affordances 168 and 170. In response to a user input on affordance 168, the system will generate tables (e.g., table 166-1 in FIG. 1N) summarizing experimental metadata for the designed cell-based screening assay experiment. The tables provide for visually inspecting and reviewing the designed cell-based screening assay experiment. The tables summarize parameters relevant to the designed experiment in unique layouts. A user may choose which table to display providing an input on corresponding affordances (e.g., affordances 164). For example, the tables are arranged in accordance with plates, layers, conditions, reagents, and sources. In FIG. 1N, a user has selected affordance 164-1 labeled as 'Plates' corresponding to table 166-1. Table 166-1 includes parameters relevant to the designed experiment arranged in accordance with plate numbers (e.g., 1, 2, and 3). Table 166-1 provides parameter related destination concentration, reagent count, transfer volumes and transfer count. For example, in table 166-1, the first plate includes a disease layer with a concentration of 'c1,' a treatment layer with concentrations of 'c2,' 'c3, and 'c4,' and a backfill layer with a concentration of 'c6.' The reagent count referring to a number of reagents for each layer for the first test plate includes one disease reagent, 56 treatment reagents, and one backfill reagent. The system has determined a transfer volume for each of the disease reagents, treatment reagents and the backfill solution, which are listed under 'Unique Volumes.' Table 166-1 also includes transfer count referring to the number of transfers for each layer for the first test plate. FIG. 1Q is another exemplary illustration of second section 100-B of user interface 100. In FIG. 1Q, a user has selected affordance 164-2 to display table 166-2. Table 166-2 also includes relevant parameters of the designed experiment but with a distinct layout compared to table 166-1 shown in FIG. 1N. In table 166-2 the parameters are arranged in accordance with layers (e.g., layers labeled as 'disease,' 'treatment,' and 'backfill').

Figure 2A:
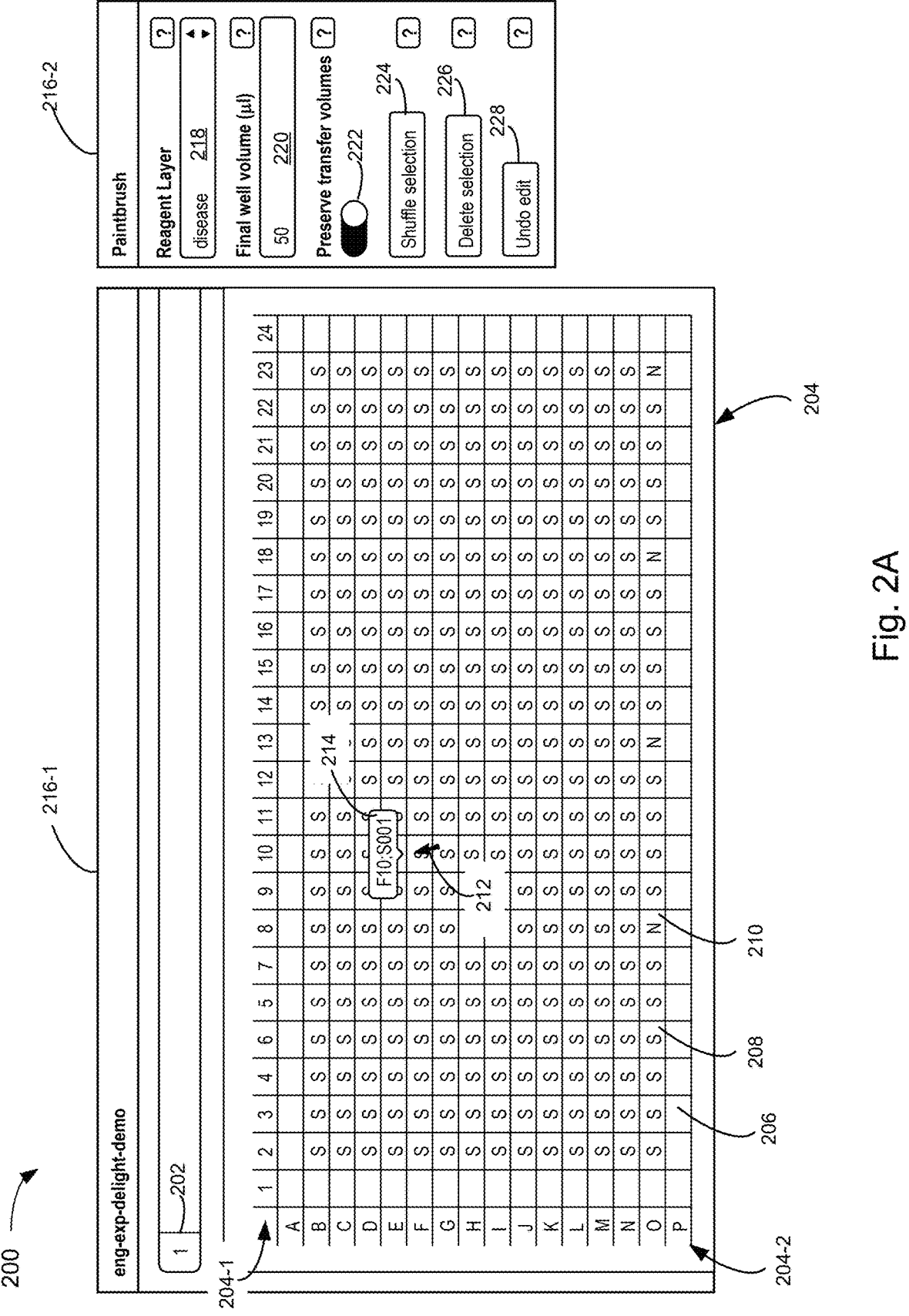
FIGS. 2A-2B are exemplary illustrations of a fourth section of a user interface for designing cell-based screening assay experiments in accordance with some embodiments.
Figure 2B:
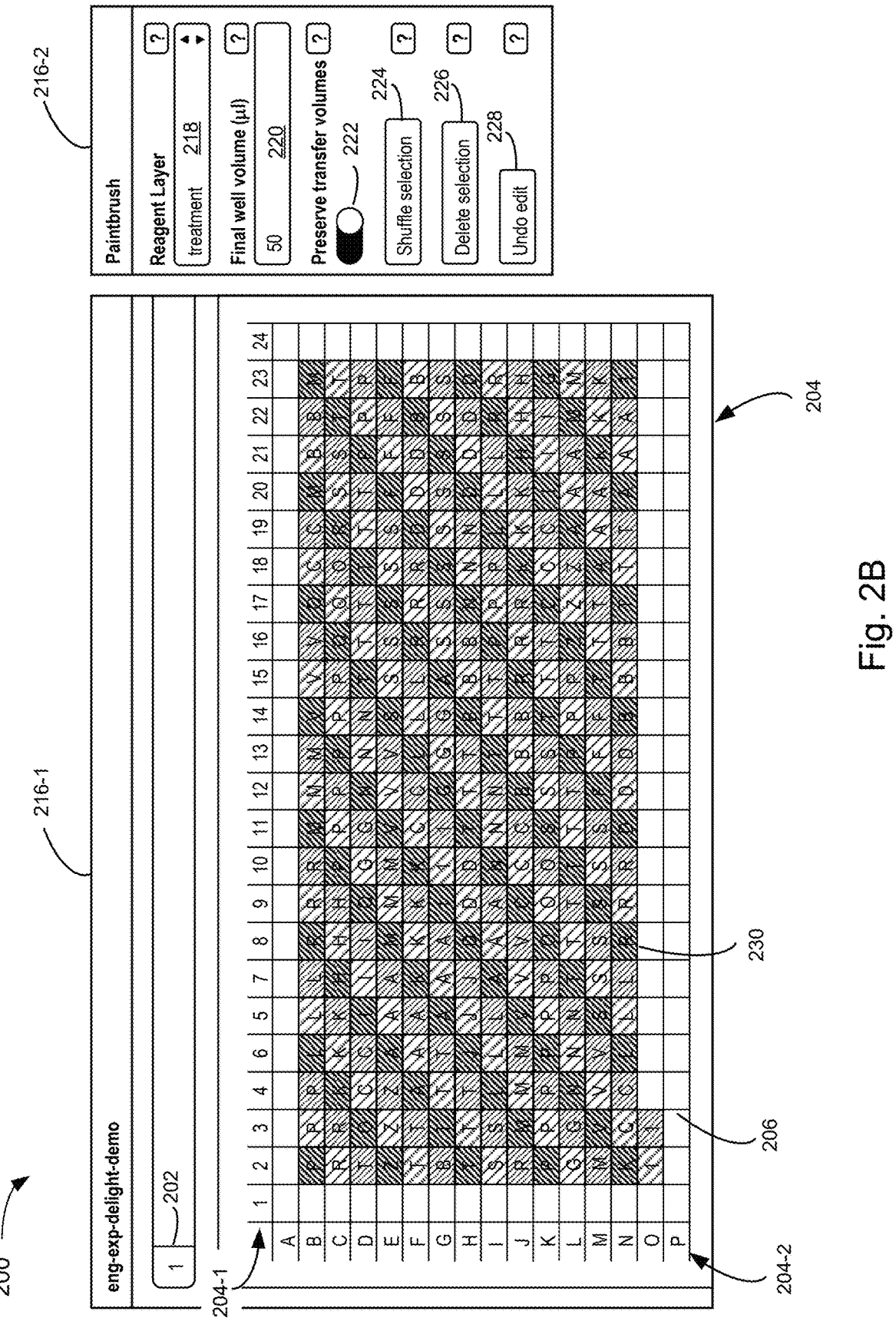
Figure 4K:
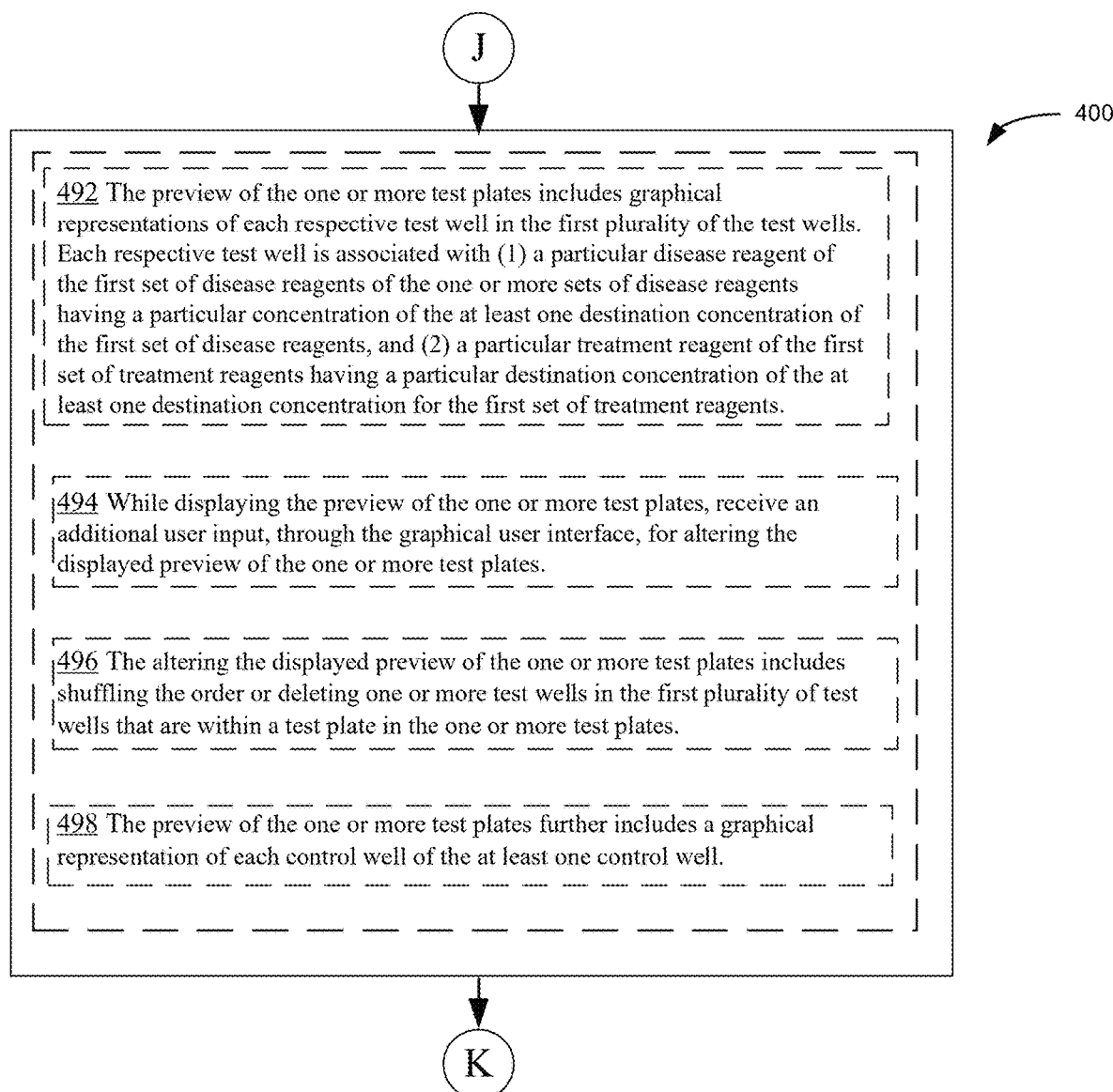

In response to a user input on affordance 170 in FIG. 1N, the system will provide previews of each test plate of the designed cell-based screening assay experiments, such as the previews described with respect to FIGS. 2A-2B. FIGS. 2A-2B are exemplary illustrations of preview section 200 of a user interface 100 for designing cell-based screening assay experiments in accordance with some embodiments. Preview section 200 includes plate preview 216-1 and tool section 216-2. Plate preview 216-1 includes affordance 202 for defining which test plate of the plates included in the designed experiment is previewed. For example, the plates are identified by a plate number (e.g., 1, 2, 3). Plate preview 216-1 further includes an image of plate 204 including a plurality of graphical objects corresponding to wells (e.g., objects 206, 208 and 210). Each well on plate 204 is identified by a unique coordination defined by column identification 204-1 (e.g., 1, 2, 3, 4, etc.) and row identification 204-2 (e.g., A, B, C, D, etc.). Tool section 216-2 includes affordance 218 for selecting which layer of the layers defined in column 132 in FIG. 1D is selected. In FIG. 2A, the layer labeled as 'disease' is being selected and therefore plate 204 includes a plurality of graphical objects illustrating test wells including a disease layer (e.g., objects 208 identified by symbol 'S') and a plurality of graphical objects illustrating control wells including a disease layer (e.g., objects 210 identified by symbol 'N'). Objects 206 are empty wells (i.e., edge wells), corresponding to empty wells 124 in FIG. 1A. A user may review a reagent associated with each well by providing an input directed to a particular well. For example, by bringing cursor 212 on top of a particular object for an extended time or by clicking the particular object with cursor 212, a user initiates displaying review element 214. Review element 214 includes, for example, the coordinates of the specified well on the plate (e.g., coordinate F10) and an identifier (e.g., corresponding to identifier 152-1 described above with respect to FIG. 1D) associated with the disease reagent included in the reviewed well (e.g., identifier labeled as 's001').

In some embodiments, a user may modify the designed experiment using tool section 216-2. Tool section 216-2 allows the user to change the final well volume of the plate by entering a volume to input element 220. Affordance 222 (e.g., a slide bar) allows user to select whether to preserve or not to preserve transfer volumes. Tool section 216-2 also allows user to rearrange (e.g., shuffle) the wells, including wells corresponding to objects 208 and 210, on plate 204 with affordance 224. Tool section 216-2 also allows user to delete one or more selected objects 208 and/or 210 with affordance 226. The tool section 216-2 also includes affordance 228 to undo edits done with tool section 216-2, thereby returning the design to its original configuration. In FIG. 2B, the layer labeled as 'treatment' is being selected in affordance 218 and therefore plate 204 includes a plurality of graphical objects illustrating corresponding to test wells including treatment reagents (e.g., objects 230). In FIG. 2B, different treatment reagents are characterized by different features of objects 230 (e.g., by patterns, color or by letters or symbols).

FIG. 3 is an exemplary illustration of liquid transfer instructions 300 in accordance with some embodiments. Liquid transfer instructions include instructions required for performing the designed cell-based screening assay with commercially available devices and/or systems for performing high throughput screening assay experiments. In some embodiments, instructions 300 are provided in a plain text format, such as comma separate value (csv) format. In some embodiments, liquid transfer instructions 300 are generated in response to a request to generate the instructions (e.g., by user input on an affordance). Liquid transfer instructions 300 include a plurality of columns, including, but not limited to, column 302 including physical coordinates of each well on a particular test plate, columns 303-306 defining reagents associated with each respective well on the particular test plate, column 307 defining concentrations associated with respective reagents, and column 308 identifying whether the respective wells are control wells.

Now that details of interface 100 for designing cell-based screening assay experiments are disclosed, details regarding methods and features for designing cell-based screening assay experiments, in accordance with an embodiment of the present disclosure, are disclosed. FIGS. 4A-4K illustrate flow charts describing method 400 for designing cell-based screening assay experiments in accordance with some embodiments. In some embodiments, such methods and features are carried out by user interface instructions 504 of memory 592 of system 500 described below with respect to FIG. 5.

Block 402. With reference to block 402 of FIG. 4A, method 400 includes receiving a first user input identifying a template plate definition for the cell-based screening assay. The first user input includes defining a template plate in section 100-A of user interface 100 in FIG. 1A. The template plate definition includes one or more pluralities of template test wells (e.g., test template wells 126) and at least one template control well (e.g., control template wells 122).

Block 404. With reference to block 404 of FIG. 4A, method 400 includes receiving a second user input defining one or more sets of disease reagents associated with a first plurality of template test wells in the one or more pluralities of template test wells, and at least one destination concentration of the one or more sets of disease reagents. FIG. 1D includes table 129 of section 100-B of interface 100, where a user has defined a number of conditions (e.g., rows R1, R2, and R3 each correspond to a specific condition). Input element 132-1 defines that the condition of row R1 is associated with a disease layer. Input element 142-1 defines disease reagents associated with condition of row R1. Input element 144-1 defines that the condition of row R1 is associated with test wells defined on row 110-1 in table 102 of section 100-A indicating that the disease reagents in input element 142-1 are physically transferred into test wells corresponding to test template wells 126 of the template plate, as defined on row 110-1 in table 102. Input element 140-1 defines a destination concentration for the disease reagents of row R1.

Block 406. With reference to block 406 of FIG. 4A, method 400 includes receiving a third user input defining a first set of treatment reagents, at least one destination concentration for the first set of treatment reagents, a number of replicates of the first set of treatment reagents, and a selection to associate the first set of treatment reagents with a first set of disease reagents in the one or more sets of disease reagents. Input element 132-2 defines that the condition of row R2 is associated with a treatment layer. Input element 142-2 defines treatment reagents (e.g., including 56 reagents in FIG. 1D) associated with the condition of row R2. Input element 140-2 defines concentrations for the treatment reagents defined in input element 142-2. Input element 146-2 defines a number replicates for the treatment reagents defined in input element 142-2. Input element 144-2 is selected to associate the treatment reagents in input element 142-2 with the condition of row R1 labeled as 'Disease 1' in input element 130-1. The selection indicates that the treatment reagents identified in input element 142-2 of row R2 are physically placed into the same test wells as the disease reagents of row R1. Alternatively, a user selects input element 144-2 to define another condition that the condition of row R1. For example, a user selects input element 144-2 to define the condition defined on row R5 in FIG. 1E indicating that the treatment reagents of row R2 are physically placed into same test wells as disease reagents of row R5. Also, alternatively, a user selects input element 144-2 to define that that the condition of row R2 is associated with a set of template wells, such as any of those defined by rows 110-1, 110-2, or 110-3 in table 102 in FIG. 1C.

Block 408. With reference to block 408 of FIG. 4A, in some embodiments, the template plate definition includes a second plurality of template test wells in the one or more pluralities of template test wells. In FIG. 1C, table 102 defines a first set of test wells on row 110-1 corresponding to test template wells 126 in template plate preview 104-2 and a second set of test wells on row 110-2 corresponding to test template wells 128 in template plate preview 104-2.

Block 410. With reference to block 410 of FIG. 4A, in some embodiments, the second user input further defines a second set of disease reagents in the one or more sets of disease reagents (e.g., the condition of row R5 includes a set of disease reagents defined in input element 152-5 in FIG. 1K).

Block 412. With reference to block 412 of FIG. 4A, in some embodiments, the second user input further defines a selection to associate the second set of disease reagents with the second plurality of template test wells in the one or more pluralities of template test wells. In FIG. 1K, table 129 defines a disease condition on row R1 associated with template wells defined on row 110-1 in table 102 in FIG. 1C and a disease condition on row R5 associated with template wells defined on row 110-3 in table 102 in FIG. 1C. Table 129 thereby indicates that the treatment reagents defined in input element 142-2 on row R1 are placed in test template wells 126 and the treatment reagents defined in input element 142-5 on row R5 are placed in test template wells 128 in the template plate. Test template wells 126 are distinct from test template wells 128.

Block 414. With reference to block 414 of FIG. 4B, in some embodiments, the first user input identifying the template plate definition for the cell-based screening assay includes (i) a number of wells assigned for the first plurality of template test wells (e.g., column 108-1 in FIG. 1A) and (ii) a number of wells assigned for the at least one template control well (e.g., column 108-2).

Block 416. With reference to block 416 of FIG. 4B, in some embodiments, the first user input identifying the template plate definition for the cell-based screening assay includes (i) a final volume for each respective template test well in a first plurality of template test wells in the one or pluralities of template test wells and (ii) a final volume for the at least one template control well. In FIG. 1A, input element 116 defines a final volume for each template well on the template plate, including test template wells 126 associated with row 110-1 (labeled as 'test') and control template wells 122 associated with row 110-2 (labeled as 'control').

Block 418. With reference to block 418 of FIG. 4B, in some embodiments, the first user input identifying the template plate definition for the cell-based screening assay includes a number of rows of the template plate and a number of columns of the template plate (e.g., input elements 112-1 and 112-2 in FIG. 1A).

Block 420. With reference to block 420 of FIG. 4B, in some embodiments, the first user input identifying the template plate definition for the cell-based screening assay includes a number of edge rows for the template plate and a number of edge columns for the template plate (e.g., input elements 114-1 and 114-2 in FIG. 1A). Wells located in the edge rows and in the edge columns are configured to remain empty during an experiment (e.g., empty wells 124 shown in template plate preview 104-1).

Block 422. With reference to block 422 of FIG. 4B, in some embodiments, the method includes displaying, in response to receiving the first user input, a preview of the template plate (e.g., template plate preview 104-1).

Block 424. With reference to block 424 of FIG. 4B, in some embodiments, the preview of the template plate includes graphical representations of (i) each template test well in the first plurality of template test wells (e.g., test template wells 126 in FIG. 1A) and (ii) each template control well in the at least one template control well (e.g., control template wells 122).

Block 426. With reference to block 426 of FIG. 4C, in some embodiments, the second user input includes at least one source concentration (e.g., input element 136-1) and at least one respective transfer volume of the first set of disease reagents (e.g., input element 138-1), and the at least one destination concentration (e.g., input element 140-1) of the first set of disease reagents is computed based on the at least one source concentration and the at least one respective transfer volume.

Block 428. With reference to block 428 of FIG. 4C, in some embodiments, the third user input includes at least one source concentration (e.g., input element 136-2) and at least one respective transfer volume (e.g., input element 138-2) of the first set of treatment reagents, and the at least one destination concentration (e.g., input element 140-2) of the first set of treatment reagents is computed based on the at least one source concentration and the at least one respective transfer volume of the first set of treatment reagents.

Block 430. With reference to block 430 of FIG. 4D, in some embodiments, the second user input further defines a disease reagent source plate identifier (e.g., identifier 135-1 in FIG. 1E). The disease reagent source plate identifier uniquely references a corresponding disease reagent source plate including the first set of disease reagents (e.g., the set of disease reagents defined in input element 142-1 are included in the source plate identified by identifier 135-1).

Block 432. With reference to block 432 of FIG. 4D, in some embodiments, the first set of disease reagents includes a set of identifiers (e.g., identifiers 152-1 in input element 142-1). Each respective identifier in the set of identifiers uniquely references a corresponding disease reagent source plate data element for a respective disease reagent in the first set of disease reagents, the corresponding disease reagent source plate data element identifying a concentration of the respective disease reagent, and, optionally, a physical location of the respective disease reagent on the corresponding disease reagent source plate.

Block 434. With reference to block 434 of FIG. 4D, in some embodiments, each respective identifier (e.g., identifier 152-1 in FIG. 1E) in the set of identifiers includes a link to the corresponding disease reagent source plate data element.

Block 436. With reference to block 436 of FIG. 4D, in some embodiments, the method includes determining, at least partially based on each respective identifier (e.g., identifier 152-1 in FIG. 1E) in the set of identifiers uniquely referencing a corresponding disease reagent source plate data element, whether a respective destination concentration (e.g., input element 140-1) for the at least one destination concentration of the one or more sets for disease reagents meets concentration criteria. As explained above with respect to FIG. 1E, concentration criteria refer to criteria defining a range of destination concentrations that can be prepared for a particular reagent from a particular source plate that the particular reagent is associated with. The concentration criteria take into consideration the source concentration of the particular reagent on its source plate (e.g., source plates defined in column 143) and the final volume of test well (e.g., as defined in input element 116 in FIG. 1A).

Block 438. With reference to block 438 of FIG. 4D, in some embodiments, method 400 includes providing, in accordance with a determination that the respective destination concentration of the at least one destination concentration of the one or more set of disease reagents does not meet the concentration criteria, an alert message (e.g., alert element 151). In some embodiments, the system determines, at least partially based on identifier 152-1 referencing a disease reagent source plate data element corresponding to reagent 's001' in input element 142-1 that a destination concentration in input element 140-1 (e.g., concentration 'c 1') does not meet concentration criteria. For example, diluting the disease reagent 's001' to the desired destination concentration c1 from the concentration the reagent has on its source plate would require addition of a volume of a backfill solution that exceeds the final volume of a template well defined in input element 116 in FIG. 1A. In accordance with the determination that the concentration criteria are not met, the system displays an alert (e.g., alert element 151) indicating to the user that such concentration of the disease reagent is not possible. The user may then adjust the destination concentration (e.g., input element 140-1), the source plate (e.g., input element 134-1) and/or the disease reagent (e.g., input element 142-1) on the respective row R1.

Block 440. With reference to block 440 of FIG. 4E, in some embodiments, the third user input further defines a treatment reagent source plate identifier (e.g., identifier 135-2 in FIG. 1D). The treatment reagent source plate identifier uniquely references a corresponding treatment reagent source plate including the first set of treatment reagents.

Block 442. With reference to block 442 of FIG. 4E, in some embodiments, the first set of treatment reagents includes a set of identifiers (e.g., identifiers 152-2 in FIG. 1C). Each respective identifier in the set of identifiers uniquely references a corresponding treatment reagent data element for a respective treatment reagent in the first set of treatment reagents. The corresponding treatment reagent data element identifies a concentration of the respective treatment reagent, and, optionally, a physical location of the respective treatment reagent on the corresponding treatment reagent source plate.

Block 444. With reference to block 444 of FIG. 4E, in some embodiments, each respective identifier (e.g., identifiers 152-2 in FIG. 1D) in the set of identifiers includes a link to the corresponding disease reagent source plate data element.

Block 446. With reference to block 446 of FIG. 4E, in some embodiments, determine, at least partially based on each respective identifier in the set of identifiers uniquely referencing a corresponding treatment reagent source plate data element, whether a respective destination concentration (e.g., destination concentrations defined in input element 140-2) of the at least one destination concentration for the first set of treatment reagents meets concentration criteria.

Block 448. With reference to block 448 of FIG. 4E, in some embodiments, provide, in accordance with a determination that the respective destination concentration of the at least one destination concentration for the first set of treatment reagents does not meet the concentration criteria, an alert message (e.g., alert element 151 in FIG. 1D). In some embodiments, the system determines, at least partially based on a respective identifier of identifiers 152-2 referencing a treatment reagent source plate data element corresponding to reagent 'S397' in input element 142-2 that a destination concentration in input element 140-2 (e.g., 'c1') does not meet concentration criteria. For example, diluting the disease reagent 'S397' to the desired destination concentration 'c1' from the concentration the reagent has on its source plate would require addition of a volume of a backfill solution that exceeds the final volume of a template well defined in input element 116 in FIG. 1A. In accordance with the determination that the concentration criteria are not met, the system displays an alert (e.g., alert element 151) indicating to the user that such concentration of the treatment reagent is not possible. The user may then adjust the destination concentration (e.g., input element 140-2), the source plate (e.g., input element 134-2) and/or the disease reagent (e.g., input element 142-2) on the respective row R2.

Block 450. With reference to block 450 of FIG. 4F, in some embodiments, the third user input further defines a second set of treatment reagents, at least one destination concentration of the second set of treatment reagents, a number of replicates of the second set of treatment reagents, and a selection to associate the second set of treatment reagents with the first set of disease reagents (e.g., a treatment condition defined on row R5 in FIG. 1K).

Block 452. With reference to block 452 of FIG. 4F, in some embodiments, the third user input further defines an order for arranging the first plurality of test wells over the one or more test plates. The definition of the order for arranging the test wells includes defining a first resolve parameter and a second resolve parameter. The first resolve parameter and the second resolve parameter are each independently chosen from among the first set of treatment reagents, the at least one destination concentration for the first set of treatment reagents, and the replicates of the first set of treatment reagents and the first resolve parameter takes precedence over the second resolve parameter. In FIG. 1D, affordances 150-2A, 150-2B, and 150-2C in column 150 define an order for arranging test wells including treatment reagents defined in input element 142-2 over test plates. In FIG. 1D, affordance 150-2A indicates that the first resolve parameter is concentration, e.g., the test wells are arranged by iterating through each of the 56 treatment reagents defined in input element 142-2 with a first concentration (e.g., concentration 'c2' defined in input element 140-2), secondly iterating through each of the 56 treatment reagents with a second concentration (e.g., concentration 'c3' defined in input element 140-2), and thirdly iterating through each of the 56 treatment reagents with a third concentration (e.g., concentration 'c4' defined in input element 140-2).

Block 454. With reference to block 454 of FIG. 4F, in some embodiments, the definition of the order for arranging the test wells further includes defining a third resolve parameter (e.g., affordance 150-2C). The second resolve parameter takes precedence over the third resolve parameter. In FIG. 1D, the third resolve parameter (e.g., affordance 150-2C) is replicates, indicating that the replicates (e.g., five replicates as defined in input element 146-2) are iterated after all treatment reagents are iterated through all concentrations. Such resolve order places the replicates of each test condition combination as far away from each other as possible. For example, in some cases the replicates of each test condition combination are placed throughout all test plates required to perform the designed screening assay experiment.

Block 456. With reference to block 456 of FIG. 4F, in some embodiments, the first resolve parameter is chosen to be the first set of treatment reagents, the second resolve parameter is chosen to be the at least one destination concentration for the first set of treatment reagents, and the third resolve parameter is chosen to be the replicates of the first set of treatment reagents (e.g., affordances 150-2A, 150-2B, and 150-2C in FIG. 1D).

Block 458. With reference to block 458 of FIG. 4F, in some embodiments, the second user input further defines an additional resolve parameter. The additional resolve parameter takes precedence over the first resolve parameter. The additional resolve parameter is chosen from among the one or more sets of disease reagents and the at least one destination concentration of the one or more sets of disease reagents. In FIG. 1H, an additional resolve parameter corresponds to input provided by affordances 150-1A, 150-1B, and 150-1C that define the order for arranging the disease reagents defined in input element 142-1. The resolve order condition of row R1 takes precedence over the resolve order for condition of row R2. In accordance with the input provided in column 150 in FIG. 1H, the test wells are arranged by iterating through each of the 56 treatment reagents defined in input element 142-2 with a first concentration (e.g., concentration 'c2' defined in input element 140-2) against a first disease reagent (e.g., disease reagent labeled as 's001' corresponding to identifier 152-1 in FIG. 1H), secondly iterating through each of the 56 treatment reagents with a second concentration (e.g., concentration 'c3' defined in input element 140-2) against the first disease reagent, and thirdly iterating through each of the 56 treatment reagents with a third concentration (e.g., concentration 'c4' defined in input element 140-2) against the first disease reagent. After all combinations of treatment reagents of different concentrations are iterated for the first disease reagents, the same is repeated for a second disease reagent (e.g., disease reagent labeled as 's602' corresponding to identifier 154 in FIG. 1H).

Block 460. With reference to block 460 of FIG. 4G, method 400 includes automatically generating, based at least partially on the first user input, the second user input and the third user input, a design for the cell-based screening assay.

Block 462. With reference to block 462 of FIG. 4G, the automatically generating includes (i) determining, from among the one or more pluralities of template test wells, a number of template test wells required for performing the cell-based screening assay experiment, thereby defining a first plurality of test wells in the design; and (ii) distributing the first plurality of test wells over one or more test plates in the design, wherein each test plate in the one or more test plates is an instance of the template plate definition (e.g., the template plate defined in FIG. 1A corresponding to the plate of template plate preview 104-1). For example, the experiment defined in FIG. 1D requires 840 test wells (i.e., 56 reagents×3 concentrations×5 replicates) distributed over three test plates that are instances of the template plate defined in FIG. 1A.

Block 464. With reference to block 464 of FIG. 4G, in some embodiments, the automatically generating the design for the cell-based screening assay experiment includes associating each test well of the first plurality of test wells with (1) a particular disease reagent of the first set of disease reagents in the one or more sets of disease reagents having a particular destination concentration of the at least one destination concentration of the first set of disease reagents, and (2) a particular treatment reagent of the first set of treatment reagents having a particular destination concentration of the at least one destination concentration for the first set of treatment reagents. For example, an exemplary test well, which is an instance of a well defined by row 110-1 in table 102 in FIG. 1C, includes disease reagent 's001' defined in input element 142-1 with concentration c1 defined in input element 140-1 and treatment reagent 'S0397' defined in input element 142-2 with concentration c1 defined in input element 140-2.

Block 466. With reference to block 466 of FIG. 4H, in some embodiments, the method includes receiving an additional user input adding one or more additional disease reagents to the first set of disease reagents. The design for the cell-based screening assay is automatically generated based on additionally, at least partially on, the additional user input. For example, a user has added a disease reagent corresponding to identifier 154, in addition to the disease reagent corresponding to identifier 152-1, in input element 142-1 in FIG. 1H. The system automatically updates the experiment design to include the second disease reagent corresponding to identifier 154.

Block 468. With reference to block 468 of FIG. 4H, in some embodiments, method 400 includes receiving an additional user input defining a first set of control reagents associated with the at least one template control well and at least one destination concentration of the first set of control reagents. For example, the condition defined on row R3 in FIG. 1D corresponds to a disease layer that is associated with template wells labeled as 'control' (e.g., wells defined on row 110-2 in FIG. 1A labeled as 'control') in input element 144-3. The design for the cell-based screening assay is automatically generated based on additionally, at least partially on, the additional user input. The automatically generating further includes: (iii) determining a number of template control wells (e.g., control template wells 122 in FIG. 1A) required for performing the cell-based screening assay experiment, thereby defining a first plurality of control wells; and (iv) distributing the first plurality of control wells over the one or more test plates required for performing the cell-based screening assay experiment.

Block 470. With reference to block 470 of FIG. 4H, in some embodiments, the automatically generating the design for the cell-based screening assay experiment includes associating each control well of the first plurality of control wells with a particular control reagent of the first set of control reagents having a particular concentration of the at least one destination concentration of the first set of control reagents. For example, the condition defined on row R3 in FIG. 1D corresponds a disease layer that is associated with template wells labeled as 'control' (e.g., wells defined on row 110-2 in FIG. 1A labeled as 'control') in input element 144-3.

Block 472. With reference to block 472 of FIG. 4I, in some embodiments, method 400 includes receiving an additional user input defining a backfill reagent. For example, table 155 in FIG. 1N defines a backfill solution for a disease layer on row 156-1 and a backfill layer for a treatment layer on row 156-2. The automatically generating the design for the cell-based screening assay further includes determining a deficit for each test well in the first plurality of test wells and determining, based on the deficit for each test well in the first plurality of test wells, a transfer volume of the backfill reagent required to fill up each test well of the first plurality of test well so that each well of the first plurality of test well reaches a final volume. For example, the system determines, for each test well, a transfer volume for a treatment reagent and a transfer volume for a disease reagent (i.e., a volume of a reagent from a source plate required for providing a desired destination concentration of the reagent in a final volume of the well). The system further defines a deficit for each well corresponding to a volume of backfill solution required for each well to fill up the well to the final volume (e.g., final volume defined in input element 116 in FIG. 1A)

Block 474. With reference to block 474 of FIG. 4I, in some embodiments, method 400 includes receiving an additional user input on a first affordance (e.g., affordance 168 in FIG. 1N) of the graphical user interface and generate, in response to the additional user input, a plurality of tables describing the design for the cell-based screening assay. The plurality of tables includes two or more parameters defining the designed cell-based screening assay experiment. Each table of the plurality of tables represent the one or more parameters in a unique layout. FIGS. 1N and 1Q provide exemplary tables 166-1 and 166-2, respectively, for reviewing the designed cell-based screening assay experiment. For example, table 166-1 in FIG. 1N represents parameters relevant for the designed experiment summarized for each plate (e.g., plates 1, 2, and 3 in the first column of table 166-1 labeled as 'Plates') and table 166-2 in FIG. 1Q represents parameters relevant for the designed experiment summarized for each layer (e.g., layers labeled as 'disease,' 'treatment,' and 'backfill' in the first column of table 166-2 labeled as 'Layer').

Block 476. With reference to block 476 of FIG. 4I, in some embodiments, method 400 includes displaying a plurality of affordances (e.g., affordances 164 including affordances 164-1 and 164-2 in FIG. 1Q). Each affordance of the plurality of affordances corresponds to a table of the plurality of tables describing the design for the cell-based screening assay. For example, affordance 164-1 corresponds to table 166-1 in FIG. 1N and affordance 164-2 corresponds to table 166-2 in FIG. 1Q).

Block 478. With reference to block 478 of FIG. 4I, in some embodiments, each table of the plurality of tables includes the two or more parameters defining the designed cell-based screening assay experiment. The two or more parameters include two or more of the following: a test plate identification number, a disease reagent destination concentration, a treatment reagent destination concentration, a disease reagent count, a treatment reagent count, a disease reagent transfer volume, a treatment reagent transfer volume, a backfill transfer volume, a disease reagent transfer count, a treatment reagent transfer count and a backfill treatment reagent count. For example, tables 166-1 and 166-2 in FIGS. 1N and 1Q, respectively, summarize a plurality of parameters defining the designed cell-based screening assay. The tables are useful for inspecting and reviewing the designed experiments. Each table summarizes the parameters defining the designed cell-based screening assay with a unique layout. For example, each table has a unique layout summarizing the parameters according to, e.g., plates, layers, conditions, reagents or source plates.

Block 480. With reference to block 480 of FIG. 4I, in some embodiments, in response to a user selection received on a particular affordance of the plurality of affordances, display a preview of a corresponding table of the plurality of tables describing the design for the cell-based screening assay. For example, table 166-1 is displayed in response to a user input on affordance 164-1 and table 166-2 is displayed in response to a user input on affordance 164-2.

Block 482. With reference to block 482 of FIG. 4J, in some embodiments, the automatically generating the design for the cell-based screening assay experiment is initiated by an additional user input on a first affordance of the graphical user interface. In some embodiments, the design for the cell-based screening assay experiment is generated in response to a user input on an affordance (e.g., affordance 170 in FIG. 1N). In some embodiments, the design for the cell-based screening assay is saved as experiment metadata to a database (e.g., to a database in memory 592 and/or non-volatile memory 590 of system 500 described below with respect to FIG. 5).

Block 484. With reference to block 484 of FIG. 4J, in some embodiments, the method includes generating, in response to the user input on the first affordance (e.g., affordance 170 in FIG. 1N), a set of reagent transfer instructions for performing the designed cell-based screening assay experiment (e.g., reagent transfer instructions in FIG. 3). The set of reagent transfer instructions includes, for each test well in the first plurality of test wells, a well identifier code, an identifier uniquely referencing a stock solution data element for a particular treatment reagent in the first set of treatment reagents, and a destination concentration of the particular treatment reagent in the first set of treatment reagents (e.g., columns 302, 303, 304, 305, 306, 307 and 308 in FIG. 3).

Block 486. With reference to block 486 of FIG. 4J, in some embodiments, the method includes providing the set of reagent transfer instructions for performing the designed cell-based screening assay experiment in a plain text format. The system provides liquid transfer instructions 300 in any format that is readable by systems and devices performing cell-based screening assays. For example, liquid transfer instructions 300 in FIG. 3 are provided in a plain text format, such as comma-separated values (csv).

Block 488. With reference to block 488 of FIG. 4J, in some embodiments, the method includes displaying, in response to receiving the user input on the first affordance (e.g., affordance 168 in FIG. 1Q), a preview of the one or more test plates. For example, plate previews 216-1 and 216-2 described with respect to FIGS. 2A and 2B, respectively, represent previews of a test plane designed by method 400.

Block 490. With reference to block 490 of FIG. 4J, in some embodiments, displaying the preview of the one or more test plates includes displaying a preview of a first test plate of the one or more test plates in response to a user input selecting the first test plate of the one or more test plates for preview. For example, a user selects the plate to be previewed by user input on affordance 202. The plates are, for example, identified by a number. In FIG. 2A, plate number 1 is previewed as indicated in affordance 202.

Block 492. With reference to block 492 of FIG. 4K, in some embodiments, the preview of the one or more test plates includes graphical representations of each respective test well in the first plurality of the test wells (e.g., wells 208 in FIG. 2A). Each respective test well is associated with (1) a particular disease reagent of the first set of disease reagents of the one or more sets of disease reagents having a particular concentration of the at least one destination concentration of the first set of disease reagents (e.g., a disease reagent from condition defined on row R1 in FIG. 1D), and (2) a particular treatment reagent of the first set of treatment reagents having a particular destination concentration of the at least one destination concentration for the first set of treatment reagents (e.g., a treatment reagent from condition defined in row RR in FIG. 1D).

Block 494. With reference to block 494 of FIG. 4K, in some embodiments, the method includes receiving, while displaying the preview of the one or more test plates, an additional user input, through the graphical user interface, for altering the displayed preview of the one or more test plates. Preview section 200 includes tool section 216-2 for providing additional user input for adjusting the design for cell-based screening assay in FIG. 2A. The adjustments provided in tool section 216-2 are reflected in plate preview 216-1. In some embodiments, the system saves the adjustments provided in tool section 216-2 as an experiment metadata to a database. Data related to the designed cell-based screening assay experiment is saved to a database (e.g., in memory 592 and/or non-volatile memory 590 of system 500 described below with respect to FIG. 5).

Block 496. With reference to block 496 of FIG. 4K, in some embodiments, the altering the displayed preview of the one or more test plates includes shuffling the order (e.g., affordance 224 in FIG. 2A allows a user to shuffle, or rearrange, the order of wells 208 and/or 210 on one or more test plates) or deleting one or more test wells in the first plurality of test wells that are within a test plate in the one or more test plates (e.g., affordance 226 allows a user to delete one or more test wells of wells 208 and/or wells 210).

Block 498. With reference to block 498 of FIG. 4K, in some embodiments, the preview of the one or more test plates further includes a graphical representation of each control well of the at least one control well (e.g., wells 210 represent control wells in FIG. 2A).

In one or more implementations, the system utilizes additional interfaces and approaches to generate a test plate (e.g., a plate design). For example, the system can utilize one or more approaches as described in SYSTEMS AND GRAPHICAL USER INTERFACES FOR GENERATING AND TRANSMITTING WELL PLATE LAYOUTS AND WELL COMPOSITIONS FOR PERTURBATION EXPERIMENT WORKFLOWS, U.S. patent application Ser. No. 18/640,343, filed Apr. 19, 2024, which is incorporated by reference herein in its entirety.

Figure 5:
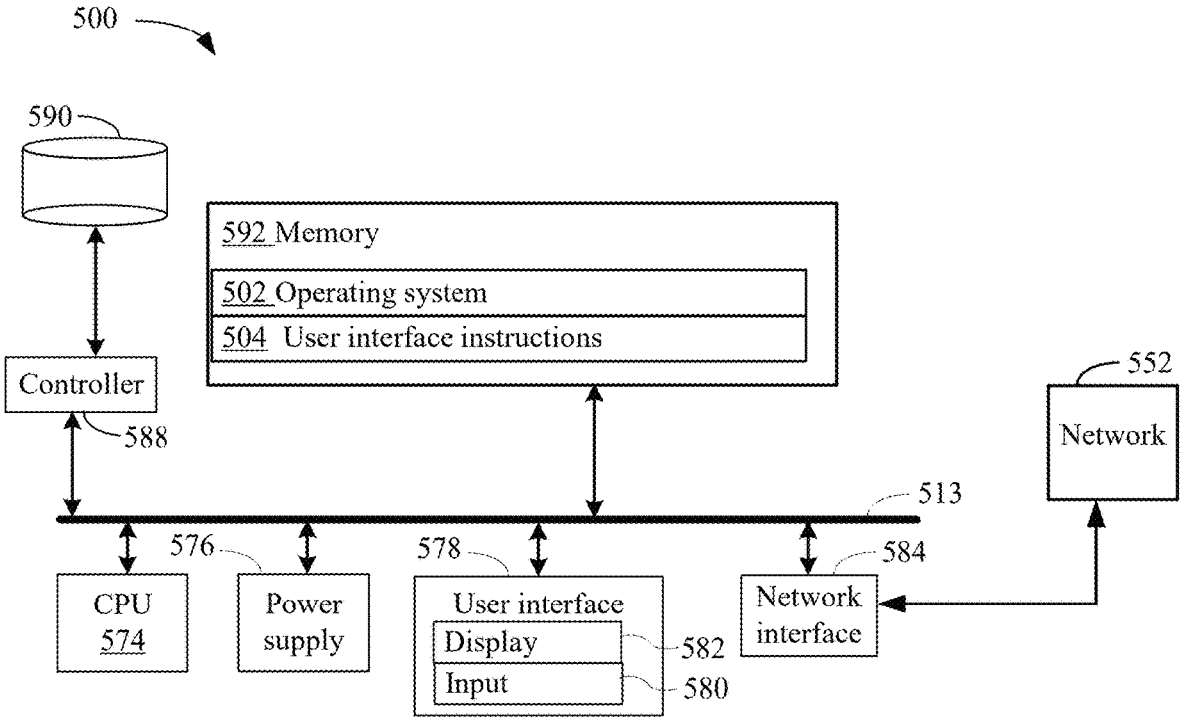
FIG. 5 is an exemplary illustration of a computer system used for designing cell-based screening assay experiments in accordance with some embodiments.

FIG. 5 is an exemplary illustration of computer system 500 used for designing cell-based screening assay experiments in accordance with some embodiments.

FIG. 5 illustrates an example of a computer system that can be used for executing a software for methods for designing a high throughput cell-based screening assay experiments of the current invention. An example system 500 for designing a high throughput cell-based screening assay experiments includes one or more processing units (CPU's) 574, network or other communications interface 584, memory 592 (e.g., random access memory), one or more non-volatile memory (e.g., magnetic disk storage and/or persistent devices) 590 optionally accessed by one or more controllers 588, one or more communication busses 513 for interconnecting the aforementioned components, user interface 578, user interface 578 including display 582 and input 580 (e.g., a keyboard, keypad, touch screen, mouse), and power supply 576 for powering the aforementioned components. In some embodiments, data in memory 592 is seamlessly shared with non-volatile memory 590 using known computing techniques such as caching. In some embodiments, memory 592 and/or non-volatile memory 590 includes mass storage that is remotely located with respect to the central processing unit(s) 574. In other words, some data stored in memory 592 and/or non-volatile memory 590 may in fact be hosted on computers that are external to the system 500 but that can be electronically accessed by the system 500 over an Internet, intranet, or other form of network or electronic cable (illustrated as element 552 in FIG. 5) using network interface 584. In some embodiments, memory 592 of system 500 for designing a high throughput cell-based screening assay experiment stores operating system 502 that includes procedures for handling various basic system services and user interface instructions 504 to facilitate graphic user interface processing. In particular, operating system 502 includes procedures for handling user interface instructions 504 for displaying and performing operations related to methods and interfaces of the present disclosure described above with respect to FIGS. 1A-4K.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer readable storage medium. For instance, the computer program product could contain the program modules shown in any combination of FIGS. 1, 2, 3, and/or described in FIG. 4. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method for designing a cell-based screening assay experiment, the method comprising:
   at a graphical user interface:
   (1) receiving a first user input identifying a template plate definition for the cell-based screening assay experiment, the template plate definition including one or more pluralities of template test wells and at least one template control well;
   (2) receiving a second user input defining (A) one or more sets of disease reagents associated with a first plurality of template test wells in the one or more pluralities of template test wells, and (B) at least one destination concentration for the one or more sets of disease reagents;
   (3) receiving a third user input defining (A) a first set of treatment reagents, (B) at least one destination concentration for the first set of treatment reagents, (C) a number of replicates of the first set of treatment reagents, and (D) a selection to associate the first set of treatment reagents with a first set of disease reagents in the one or more sets of disease reagents;
   automatically generating, based at least partially on the first user input, the second user input and the third user input, a design for the cell-based screening assay experiment, the automatically generating including:
   (i) determining, from among the one or more pluralities of template test wells, a number of template test wells required for performing the cell-based screening assay experiment, thereby defining a first plurality of test wells in the design; and
   (ii) distributing the first plurality of test wells over one or more test plates in the design, wherein each test plate in the one or more test plates is an instance of the template plate definition.

2. The method of claim 1, wherein:
   the template plate definition includes a second plurality of template test wells in the one or more pluralities of template test wells;
   the second user input further defines a second set of disease reagents in the one or more sets of disease reagents and a selection to associate the second set of disease reagents with the second plurality of template test wells in the one or more pluralities of template test wells.

3. The method of claim 1, wherein:

the third user input further defines (E) a second set of treatment reagents, (F) at least one destination concentration of the second set of treatment reagents, (G) a number of replicates of the second set of treatment reagents, and (H) a selection to associate the second set of treatment reagents with the first set of disease reagents.

4. The method of claim 1, further including;

receiving an additional user input adding one or more additional disease reagents to the first set of disease reagents, wherein:

the design for the cell-based screening assay experiment is automatically generated based on additionally, at least partially on, the additional user input.

5. The method of claim 1, wherein automatically generating the design for the cell-based screening assay experiment includes associating each test well of the first plurality of test wells with (1) a particular disease reagent of the first set of disease reagents in the one or more sets of disease reagents having a particular destination concentration of the at least one destination concentration of the first set of disease reagents, and (2) a particular treatment reagent of the first set of treatment reagents having a particular destination concentration of the at least one destination concentration for the first set of treatment reagents.

6. The method of claim 1, further comprising:

receiving an additional user input defining (A) a first set of control reagents associated with the at least one template control well and (B) at least one destination concentration of the first set of control reagents, wherein:

the design for the cell-based screening assay experiment is automatically generated based on additionally, at least partially on, the additional user input, the automatically generating further including:

(iii) determining a number of template control wells required for performing the cell-based screening assay experiment, thereby defining a first plurality of control wells; and (iv) distributing the first plurality of control wells over the one or more test plates required for performing the cell-based screening assay experiment.

7. The method of claim 6, wherein automatically generating the design for the cell-based screening assay experiment includes associating each control well of the first plurality of control wells with a particular control reagent of the first set of control reagents having a particular concentration of the at least one destination concentration of the first set of control reagents.

8. The method of claim 1, wherein the second user input includes at least one source concentration and at least one respective transfer volume of the first set of disease reagents, and the at least one destination concentration of the first set of disease reagents is computed based on the at least one source concentration and the at least one respective transfer volume.

9. A system for designing a cell-based screening assay experiment, the system comprising:

at least one processor and memory addressable by the at least one processor, the memory storing at least one program for execution by the at least one processor, the at least one program comprising instructions for:

displaying a graphical user interface;

at the graphical user interface:

(1) receiving a first user input identifying a template plate definition for the cell-based screening assay experiment, the template plate definition including one or more pluralities of template test wells and at least one template control well;

(2) receiving a second user input defining (A) one or more sets of disease reagents associated with a first plurality of template test wells in the one or more pluralities of template test wells, and (B) at least one destination concentration for the one or more sets of disease reagents;

(3) receiving a third user input defining (A) a first set of treatment reagents, (B) at least one destination concentration for the first set of treatment reagents, (C) a number of replicates of the first set of treatment reagents, and (D) a selection to associate the first set of treatment reagents with a first set of disease reagents in the one or more sets of disease reagents;

automatically generating, based at least partially on the first user input, the second user input and the third user input, a design for the cell-based screening assay experiment, the automatically generating including:

(i) determining, from among the one or more pluralities of template test wells, a number of template test wells required for performing the cell-based screening assay experiment, thereby defining a first plurality of test wells in the design; and (ii) distributing the first plurality of test wells over one or more test plates in the design, wherein each test plate in the one or more test plates is an instance of the template plate definition.

10. The system of claim 9, wherein:

the template plate definition includes a second plurality of template test wells in the one or more pluralities of template test wells;

the second user input further defines a second set of disease reagents in the one or more sets of disease reagents and a selection to associate the second set of disease reagents with the second plurality of template test wells in the one or more pluralities of template test wells.

11. The system of claim 9, wherein:

the third user input further defines (E) a second set of treatment reagents, (F) at least one destination concentration of the second set of treatment reagents, (G) a number of replicates of the second set of treatment reagents, and (H) a selection to associate the second set of treatment reagents with the first set of disease reagents.

12. The system of claim 9, wherein the at least one program further includes instructions for:

receiving an additional user input adding one or more additional disease reagents to the first set of disease reagents, and wherein:

the design for the cell-based screening assay experiment is automatically generated based on additionally, at least partially on, the additional user input.

13. The system of claim 9, wherein:

wherein automatically generating the design for the cell-based screening assay experiment includes associating each test well of the first plurality of test wells with (1) a particular disease reagent of the first set of disease reagents in the one or more sets of disease reagents having a particular destination concentration of the at least one destination concentration of the first set of disease reagents, and (2) a particular treatment reagent of the first set of treatment reagents having a particular destination concentration of the at least one destination concentration for the first set of treatment reagents.

14. The system of claim 9, wherein the at least one program further includes instructions for:

receiving an additional user input defining (A) a first set of control reagents associated with the at least one template control well and (B) at least one destination concentration of the first set of control reagents, wherein:

the design for the cell-based screening assay experiment is automatically generated based on additionally, at least partially on, the additional user input, the automatically generating further including:

(iii) determining a number of template control wells required for performing the cell-based screening assay experiment, thereby defining a first plurality of control wells; and (iv) distributing the first plurality of control wells over the one or more test plates required for performing the cell-based screening assay experiment.

15. The system of claim 14, wherein automatically generating the design for the cell-based screening assay experiment includes associating each control well of the first plurality of control wells with a particular control reagent of the first set of control reagents having a particular concentration of the at least one destination concentration of the first set of control reagents.

16. The system of claim 9, wherein the second user input includes at least one source concentration and at least one respective transfer volume of the first set of disease reagents, and the at least one destination concentration of the first set of disease reagents is computed based on the at least one source concentration and the at least one respective transfer volume.

17. A non-transitory computer readable media storing one or more programs, the one or more programs comprising instructions, which when executed by an electronic device with a display cause the electronic device to:

display a graphical user interface;

at the graphical user interface:

(1) receive a first user input identifying a template plate definition for the cell-based screening assay experiment, the template plate definition including one or more pluralities of template test wells and at least one template control well;

(2) receive a second user input defining (A) one or more sets of disease reagents associated with a first plurality of template test wells in the one or more pluralities of template test wells, and (B) at least one destination concentration for the one or more sets of disease reagents;

(3) receive a third user input defining (A) a first set of treatment reagents, (B) at least one destination concentration for the first set of treatment reagents, (C) a number of replicates of the first set of treatment reagents, and (D) a selection to associate the first set of treatment reagents with a first set of disease reagents in the one or more sets of disease reagents;

automatically generate, based at least partially on the first user input, the second user input and the third user input, a design for the cell-based screening assay experiment, the automatically generating including:

(i) determining, from among the one or more pluralities of template test wells, a number of template test wells required for performing the cell-based screening assay experiment, thereby defining a first plurality of test wells in the design; and (ii) distributing the first plurality of test wells over one or more test plates in the design, wherein each test plate in the one or more test plates is an instance of the template plate definition.

18. The non-transitory computer readable media of claim 17, wherein:

the template plate definition includes a second plurality of template test wells in the one or more pluralities of template test wells;

the second user input further defines a second set of disease reagents in the one or more sets of disease reagents and a selection to associate the second set of disease reagents with the second plurality of template test wells in the one or more pluralities of template test wells.

19. The non-transitory computer readable media of claim 17, wherein:

the third user input further defines (E) a second set of treatment reagents, (F) at least one destination concentration of the second set of treatment reagents, (G) a number of replicates of the second set of treatment reagents, and (H) a selection to associate the second set of treatment reagents with the first set of disease reagents.

20. The non-transitory computer readable media of claim 17, wherein the one or more programs further include instructions for:

receiving an additional user input adding one or more additional disease reagents to the first set of disease reagents, and wherein:

the design for the cell-based screening assay experiment is automatically generated based on additionally, at least partially on, the additional user input.

\* \* \* \* \*